(12) United States Patent
Krainiouk et al.

(10) Patent No.: US 6,233,364 B1
(45) Date of Patent: May 15, 2001

(54) METHOD AND SYSTEM FOR DETECTING AND TAGGING DUST AND SCRATCHES IN A DIGITAL IMAGE

(75) Inventors: Alexei Krainiouk, Greenbrae; Richard T. Minner, Carmichael, both of CA (US)

(73) Assignee: Dainippon Screen Engineering of America Incorporated, Irvine, CA (US)

( * ) Notice: Subject to any disclaimer, the term of this patent is extended or adjusted under 35 U.S.C. 154(b) by 0 days.

(21) Appl. No.: 09/156,949

(22) Filed: Sep. 18, 1998

(51) Int. Cl.$^7$ ........................................ G06K 9/40
(52) U.S. Cl. .................. 382/275; 382/254; 382/264; 382/205
(58) Field of Search .................... 382/254, 260, 382/264, 275, 195, 205

(56) References Cited

U.S. PATENT DOCUMENTS

| | | |
|---|---|---|
| 4,189,235 | 2/1980 | Guter et al. . |
| 4,561,022 * | 12/1985 | Bayer ................................... 382/275 |
| 4,907,156 | 3/1990 | Doi et al. . |
| 5,436,979 | 7/1995 | Gray et al. . |
| 5,923,775 * | 7/1999 | Snyder et al. ........................ 382/261 |

OTHER PUBLICATIONS

Andrew S. Glassner (ed.); "Graphics Gems," *Ap Professional* (1990) ISBN 0–12–286166–3, pp. 275–284.
William K. Pratt; "Digital Image processing," *A. Wiley–Interscience Publication* (John Wiley & Sons) (1978), ISBN 0–171–01888–0, p. 543.
James D. Foley et al., "Computer Graphics Principles and Practice (Second Edition in C)," Addison–Wesley Publishing Company, (1996) ISBN 0–201–84840–6, pp. 563–604 and 979–987.

* cited by examiner

*Primary Examiner*—Thomas D. Lee
(74) *Attorney, Agent, or Firm*—Charles J. Kulas; Townsend and Townsend and Crew, LLP

(57) ABSTRACT

A system for identifying and tagging anomalies, such as images of dust and scratches, in a digital image so that they can be removed from the image. The invention implements a technique for detecting anomalies designed to minimize the number of false positives, i.e., non-anomalous portions of the image falsely identified as anomalies. The technique bases the initial first-pass identification of anomalous image regions on the difference between the gradient of the image at each of a set of grid points in the image and the mean of the gradient of the image at nearby points. Thus a region is identified as anomalous if original image pixel values in its immediate neighborhood are more variable than they are in a larger neighborhood. This technique greatly reduces (when compared to the prior art) the identification of false positives in noisy regions of the image, such as the leaves of a tree in daylight or a pebbly beach. After a first-pass list of candidate anomalous regions has been made, the invention culls the list by means of a set of heuristic measures, including but not limited to a set of shape, size, color and visibility measures, designed to indicate how much a candidate resembled a dust fragment or a scratch.

24 Claims, 16 Drawing Sheets

METHOD AND SYSTEM FOR DETECTING AND TAGGING DUST AND SCRATCHES IN A DIGITAL IMAGE

RELATED APPLICATION

This application is related to co-pending U.S. patent application Ser. No. 09/087,284, filed May 29, 1998, entitled "Image Enhancing Brush using Minimum Curvature Solution," by R. Minner, herein incorporated by reference as if set forth in full in this application.

COPYRIGHT NOTICE

A portion of the disclosure recited in this specification contains material which is subject to copyright protection. Specifically, a Microfiche Appendix in accordance with 37 CFR Section 1.96 is included that lists source code instructions for a process by which the present invention is practiced in a computer system. The Microfiche Appendix comprises two sheets of microfiche containing 166 frames, or pages, of source code. The copyright owner has no objection to the facsimile reproduction of the specification as filed in the Patent and Trademark Office. Otherwise all copyright rights are reserved.

BACKGROUND OF THE INVENTION

This invention relates in general to computer image processing systems and more specifically to a system to identify and tag portions of a digital image representing dust or scratches on the original hard-copy image, in order that these images of dust may then be erased from the digital image.

It is a well known problem in image processing that particles of dust may accumulate on a hard-copy positive or negative version of an image, or that the hard copy may become scratched before a secondary copy of the image is made by a camera or a scanner. Conversion of a photographic negative or positive image to a digital image suitable for processing on a computer requires such a secondary copy to be made of the image, and hence it is common for digital images to be scratched or polluted by dust.

The dust pollution problem may be alleviated either by early-detection or late-detection techniques. Early-detection techniques, such as are taught in U.S. Pat. No. 4,189,235, entitled "Test Device for Dynamically Measuring the Degree of Dirt Accumulation on Bank-Notes" by Guter et al., detect dust on an original hard copy image before it is scanned, thus permitting the image to be cleaned by mechanical means before scanning. In contrast, late-detection techniques detect the representations in the digitized image of dust on the original image with the intent of then letting the user of the computer system retouch the image so as to remove the dust. Typically, early-detection techniques require special hardware, not part of a normal digital image-processing setup. In contrast, late-detection techniques use only the standard digital image-processing hardware. Late-detection techniques use the main computer of the image-processing setup to identify representations of dust in the digital image, thus permitting the dust to be removed from the image either by manual intervention by the computer operator or by additional computer software. The dust-detection techniques of this invention are late-detection techniques.

A patent which teaches a technique which is a hybrid between early-detection techniques and late detection techniques is U.S. Pat. No. 5,436,979 entitled "Process for Detecting and Mapping Dirt on the Surface of a Photographic Element" by Gray et al. This patent describes a technique which is like the late-detection techniques in that it uses conventional image-processing hardware and software to scan an image and to detect digitized representation of dust in the digital image. However, the invention scans a blank image (a blank piece of film) with the intent that if dust is detected on the blank image the operator of the image scanner may adjust the scanner's cleaning process to minimize the level of dust on subsequent non-blank images. The "blank" images scanned by the cited invention are not featureless. They may be, for example, pieces of unexposed film containing the graininess of the film itself. Hence the problem of identifying the scanned image of dust against the scanned grainy background has something in common with the problem of identifying the scanned image of dust against a scanned developed piece of film. The patent describes a process of (a) first blurring the digital image, and then (b) taking the difference between the blurred image and the original image, thus forming a residual difference image in which anything in the residual image that is sufficiently different from the blurred image can be presumed to be an anomaly. Any such anomaly is then a candidate to be deemed a piece of dust (after further testing).

As described in U.S. Pat. No. 5,436,979 cited above, the process of looking for dust in a digitized image is the process of looking for anomalies in the image. The same is true of the process of looking for scratches. Hence practitioners of the art of dust or scratch detection in images can learn something from other arts that detect anomalies in images such as, in particular, medical imaging software for detecting images of tumors. A patent teaching the latter art is U.S. Pat. No. 4,907,156, entitled "Method and System for Enhancement and Detection of Abnormal Anatomic Regions in a Digital Image" by Doi et al.

U.S. Pat. No. 4,907,156 on "Abnormal Anatomic Regions" is like U.S. Pat. No. 5,436,979 on "Detecting and Mapping Dust" in that it finds candidate anomalies by forming the difference between an original image (or a simple derivative thereof) and a blurred version of the original image. Pixels (picture elements) with extreme values in the difference image represent pixels whose values differ a lot from the values of their neighbors in the original image and hence are candidates to be anomalies. The specific technique in the "Anatomic Regions" patent forms an SNR-maximized image (where "SNR" denotes the signal to noise ratio), in which anomalous features such as tumors will be emphasized, and also a blurred or SNR-minimized image. A difference image is formed, representing the difference between the SNR-maximized image and the SNR-minimized image. Pixels or groups of pixels with extreme values in the difference image are candidates to be deemed images of tumors. Subsequent additional image processing, using "circularity, size and growth tests", is then used to further characterize the already-detected candidate tumors.

Difference techniques which compare pixel values to the mean of pixel values in the local neighborhood, such as described above, tend to do a good job of detecting anomalies (dust, scratches or tumors) against a uniform or smoothly varying background, such as sky, but a poor job of detecting anomalies against a varied or chaotic background, such as the leaves of a tree in sunlight, or a pebbly beach. In the latter case, the difference techniques described above will have a great number of false positives, i.e., groups of pixels falsely deemed to be anomalies. This is because it is characteristic of a chaotic portion of an image that it has lots of pixels whose values differ greatly from the neighborhood mean value. This characteristic is precisely the distinguishing characteristic of anomalies under the standard difference techniques. Hence these techniques tend to produce an inordinately large number of false positives in chaotic regions of the image. A result is that when using such techniques it is necessary to do a lot of post-processing, either manually by looking at an image, or with additional computer processing, to discard as dust or scratch candidates these false positive pixels or groups of pixels.

SUMMARY OF THE INVENTION

The present invention provides a system for detecting anomalies such as dust or scratches on an image, such as a photograph, and overcomes some of the problems of the prior art approaches. For example, the approach of the present invention results in fewer false detections. The principal idea underlying the present invention's technique for reducing the number of false positives is that it should take a much stronger indicator to cause a pixel to be tagged as a dust or scratch candidate in a chaotic region of the image (e.g., a pebbly beach), than in a smooth or smoothly varying region of the image (e.g., the sky). The present invention achieves the goal of reducing the number of first-pass false positives by taking as its first candidates for dust or scratch particles not those pixel regions whose values stand out from the mean of the values of neighboring pixels, but rather those pixel regions whose gradient values stand out from the mean of the gradient values of neighboring pixels. The gradient value of a pixel is a measure of how rapidly the image is varying in the immediate neighborhood of the pixel. Since, in the present invention, the first-pass dust or scratch candidates are groups of pixels whose gradient values differ considerably from the mean of the gradient values of the neighboring pixels, a result is that the gradient value required to cause a pixel to be tagged as a dust or scratch candidate is higher over a chaotic, rapidly varying, part of the image than over a smooth part of the image.

Overall, the dust and scratch detection techniques in the invention were designed to a) yield fewer first-pass false positives;

b) be robust and balanced; yield neither too many false positives nor too many false negatives;

c) be fast.

The design goals are dependent: reducing the number of false positives as in (a) reduces the amount of post-processing required to winnow out the false positives and hence helps the system be fast as in (c).

In addition, this invention was designed to be paired with an invention for filling in voids in the image (such as are formed when the dust pixels or scratch regions are voided out), to yield an overall system for detecting and removing dust or scratches in a digital image. The void-filling invention is U.S. patent application Ser. No. 09/087,284, filed May 29, 1998, entitled "Image Enhancing Brush using Minimum Curvature Solution," by Minner, to be assigned to the same assignee as the present invention.

The invention includes a method running within a program on a personal computer or desktop computer. The computer user has caused a digital image to reside in one of the computer's memory units. A typical digital image may consist of millions of pixels, almost invariably arranged into a rectangular grid. Each pixel is in turn partitioned into one or more channels, each encoding the intensity of light in a color channel. A single-channel image is monochrome. Typical three-channel images encode separately the intensities of red, blue and green light. A typical image has a fixed range of possible intensity levels for each channel of each pixel. An image with only two possible intensity levels is binary or bi-level. Typical multi-level images have 256 (or more) intensity levels per channel.

The invention allows a good first-pass identification of dust or scratch regions from two images supplemental to the original image.

The first supplemental image, the gradient image, is a measure of the average magnitude of the gradients of the (one or more) channels of the original image. The gradient measure used for this first supplemental image is obtained by convolving the one or more channels of the original image with one or more small (typically two rows by two columns) kernels. The goal is to obtain a measure of the magnitude of variability in the original image in very small regions centered on the vertex or intersection point of four pixels in the original image. The choice of kernels with an even number of rows and columns causes the grid of these gradient measures to be offset by measure one-half with respect to the grid of the original image; i.e., the center of each pixel in the gradient image is centered on the vertex of four pixels in the original image. Thus the grid of the gradient image, and the grid of subsequent images derived from it, is oriented to the vertices (not the pixel centers) of the grid of the original image, and so is a vertex-centered grid (with respect to the original image). However many channels the original image has, the gradient image is a single-channel image, with the final gradient measure at any pixel obtained by combining (averaging or taking the maximum of, etc.) the gradient measures at the same pixel in the various channels.

The second supplemental image, the blurred-gradient image, is formed from the gradient image by replacing the value of each pixel in the gradient image with the mean of the values of pixels in its neighborhood. Typically, this is done by convolving the gradient image with a larger averaging kernel with an odd number of rows and columns. For example, such a kernel might have 41 rows and 41 columns. Average values for pixels near the image edge are obtained by reducing the kernel's size so that it only samples pixels which are actually within the image.

The gradient image and the blurred-gradient image then become the basis for the identification of digitized dust particles or scratches in the digital image. This identification process makes use of the empirically-verified finding that the scanned image of a particle of dust or a scratch is typically characterized by both of the following properties. The first property of a typical such anomaly is that it contains at least one pixel (and often several pixels) whose gradient value is very much larger than the mean of the gradient values of neighborhood pixels. Call a set of such pixels the yolk, by analogy to an egg, of the dust particle. The second property is that extending outward from the yolk of the dust particle all pixels whose gradient values exceed the local mean gradient by a certain amount, a smaller amount than that by which the pixels in the yolk exceed the local mean, are also part of the dust particle. Call this set of pixels, once again by analogy to an egg, the white of the anomaly.

This invention scans over the vertex-centered pixels of the gradient image, looking for any pixels whose gradient values exceed the local mean by a first large threshold value or by a second smaller threshold value. It assigns such pixels values of 2 and 1 respectively. All other pixels of the vertex grid are then assigned value 0.

Having thus constructed a trinary vertex-centered image based on the gradient and blurred-gradient images, the invention then scans over the trinary image, looking for blobs (contiguous sets) of positively-value pixels within which there are at least some values of 2. I.e., it looks for blobs which contain a yolk. All such blobs, including their whites, are identified as candidate anomalies; their constituent pixels are set to value 1 in a new binary vertex-centered candidate-dust-or-scratch image. All blobs lacking a yolk are ignored; their constituent pixels are set to value 0 in the new binary image.

This concludes the first-pass techniques of the invention. The goal of the first pass is to construct a list of candidate dust particles or scratches erring slightly in the direction of false positives, but not nearly so far in that direction as the prior-art techniques cited above. I.e., the first-pass list should have falsely excluded few actual visible dust particles (it should have few false negatives), and it should include a probably somewhat larger number of false positives (larger than the number of false negatives). Such a list can then be converted into a final list of dust particles or scratches by culling out some of the false positives.

The final culling operation uses a set of heuristic techniques including visibility tests, color tests, shape tests, and size tests, or order to remove false positives from the list.

The above summary emphasized the prime importance to the invention of the fact that the first-pass identification of dust particles or scratches is based not on a comparison of the image values to neighborhood means of the image values, but on a comparison of derived gradient values to neighborhood means of the gradient values. As noted above, this aspect of the invention greatly reduces the number of false positives over prior-art techniques.

A second important aspect of the invention is the fact of the location of the gradient and blurred-gradient images, and hence also of the subsequent first-pass binary dust map, on a vertex-centered grid, displaced by half a pixel in the x and y directions from the pixels of the original image. Every pixel or set of pixels in the original image can be enclosed within a closed curve of pixels from the vertex-centered grid. For example, as shown in FIG. 2, a single pixel 100 from the original grid is enclosed by four pixels 101, 102, 103, 104 from the vertex-centered grid. Consequently, the invention, when analyzing the vertex-centered binary dust and scratch map, created at the end of the first pass as described above, can base its identification of dust or scratches in the original image on closed contours of positive values in the vertex-centered image. Open contours of positive values can be discarded from the binary image without in any way disabling the identification of dust in the original. For example, FIG. 3 shows a hypothetical binary vertex-centered dust and scratch image in which there is one open contour 200, one closed contour 210, and one mixed contour 220 containing a closed portion 230 and tail 240. FIG. 4 shows the same hypothetical binary vertex-centered dust image after deletion of the open contour 200 and the tail 240 of the mixed contour 220. All that remains in FIG. 4 are two closed contours 210 and 230. In this invention, all identification of dust in the original image is based on closed contours of the auxiliary vertex-centered binary image. This aspect of the invention makes it faster and computationally more simple to identify dust and scratches in the original image than it would be if the gradient images and the derivatives thereof, such as the binary image, were not vertex-centered.

DESCRIPTION OF THE SPECIFIC EMBODIMENTS

Figure 1:
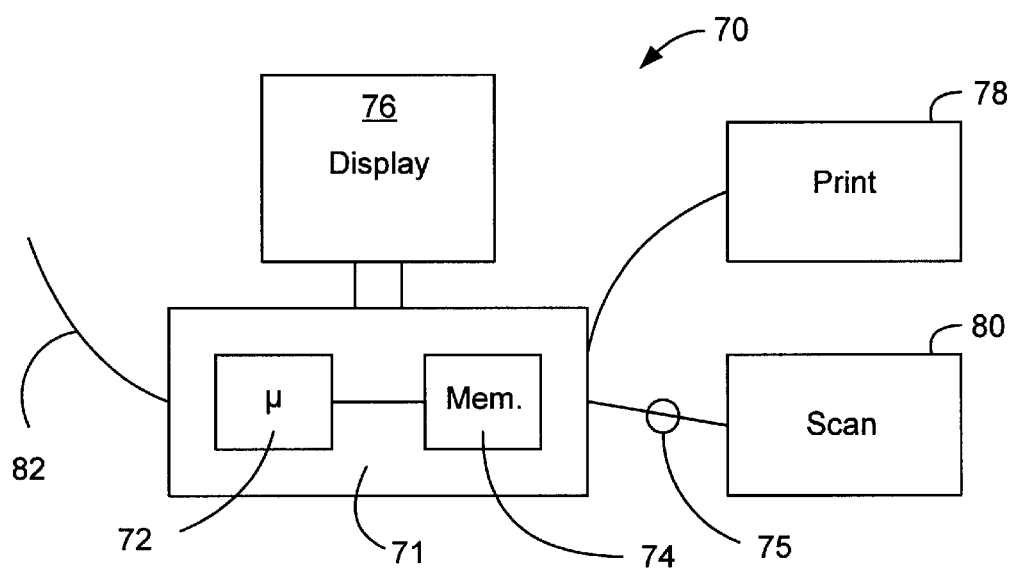
FIG. 1 illustrates an embodiment of an image processing system for detecting and tagging dust and scratches in a digital image.

FIG. 1 illustrates an embodiment of an image processing system for detecting and tagging dust and scratches in a digital image. Image processing system 70 includes a computer system 71 comprising a microprocessor 72 and a memory 74. Microprocessor 72 performs the image processing and memory 74 stores computer code for processing images. Computer system 71 is any type of computer, such as a PC, a Macintosh, laptop, mainframe or the like. Imaging system 70 also includes a scanner 80 for scanning images directly. Computer system 71 is coupled to monitor 76 for displaying a graphical user interface and master original images as well as modified images. Computer system 71 is also coupled to various interface devices such as internal or external memory drives, a mouse and a keyboard (not shown). Printer 78 allows for the printing of any images as required by the user. Cable 82 provides the ability to transfer original and corrected images to and from another computer device via e-mail, the Internet, direct access or the like.

Images may be captured by placing a photograph or a printed sheet of paper or a page of a book on the platen of a flatbed scanner and scanning. The scanned image is sent directly to computer system 71 via bus 75 where it is processed according to the present invention. The invention, however, is not limited to inputting the captured image to computer system 71 via a direct connection. Any means as is well known in the art can be used for inputting the captured image to computer system 71. For example, as is well known in the art, the captured image can be stored on a memory disk and input using a memory drive, the image can be printed by another computer system and the printed image subsequently scanned in using scanner 80, or the image can be transmitted via cable 82 over the internet, via a satellite transmitter, or via a terrestrial antenna.

Figure 5:
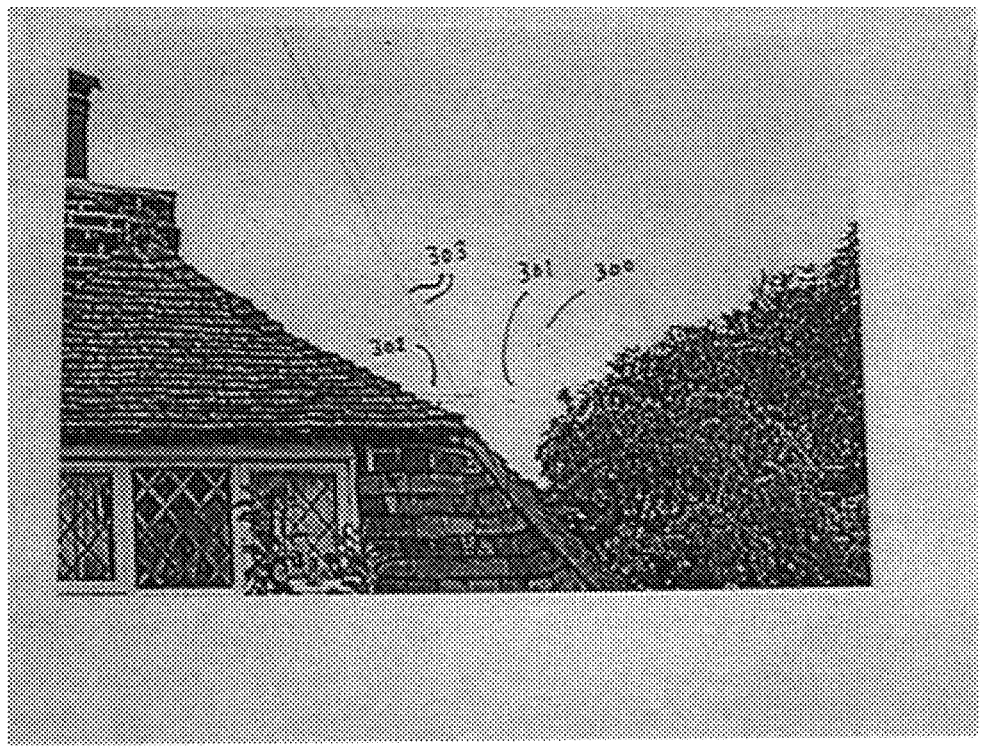
FIG. 5 shows a portion of a digitized dusty picture.

FIG. 5 shows an example of a portion of digitized dusty photograph copied from an original photograph using a flatbed scanner. FIG. 5 shows, on the left, a portion of the second story of a cottage, on the right a group of trees, and in the middle and at the top a portion of sky. The whole image is very dusty, although the dust particles are visible to the eye only in the part of the image, the sky, that has a roughly uniform background. Objects 300 and 301 are large dust particles. Object 302 is an antenna on the roof of the house. Object 303 is a pair of wires connected to the house.

Figure 6:
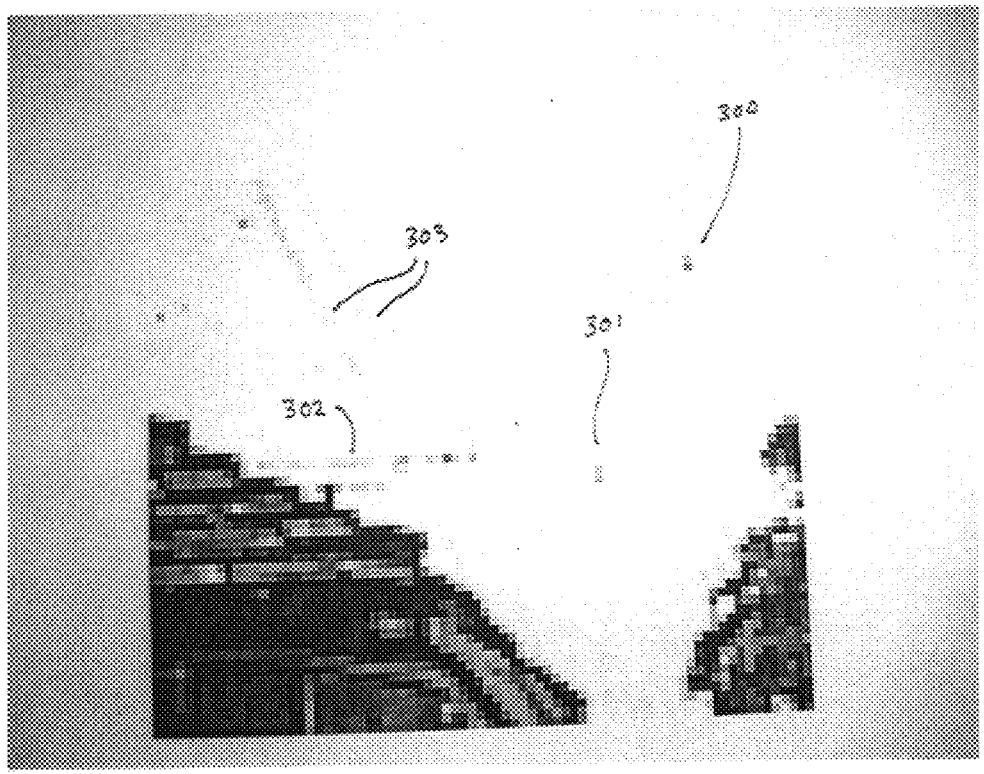
FIG. 6 is an expanded view of a portion of FIG. 6 in which individual pixels can be seen.

FIG. 6 is a blown up version of FIG. 5 centered on the region of intersection of the house, the sky and the trees. It is now possible to see the individual pixels of dust particles 300 and 301, of antenna 302 and of wires 303.

The goal of the present invention is to detect and tag in an image such as the one shown in FIGS. 5 and 6 anomalies such as dust particles 300 and 301 (for purposes of eventual elimination) while leaving intact actual image features such as antenna 302 and wire 303 which bear some visual resemblance to dust or scratches.

Figure 7:
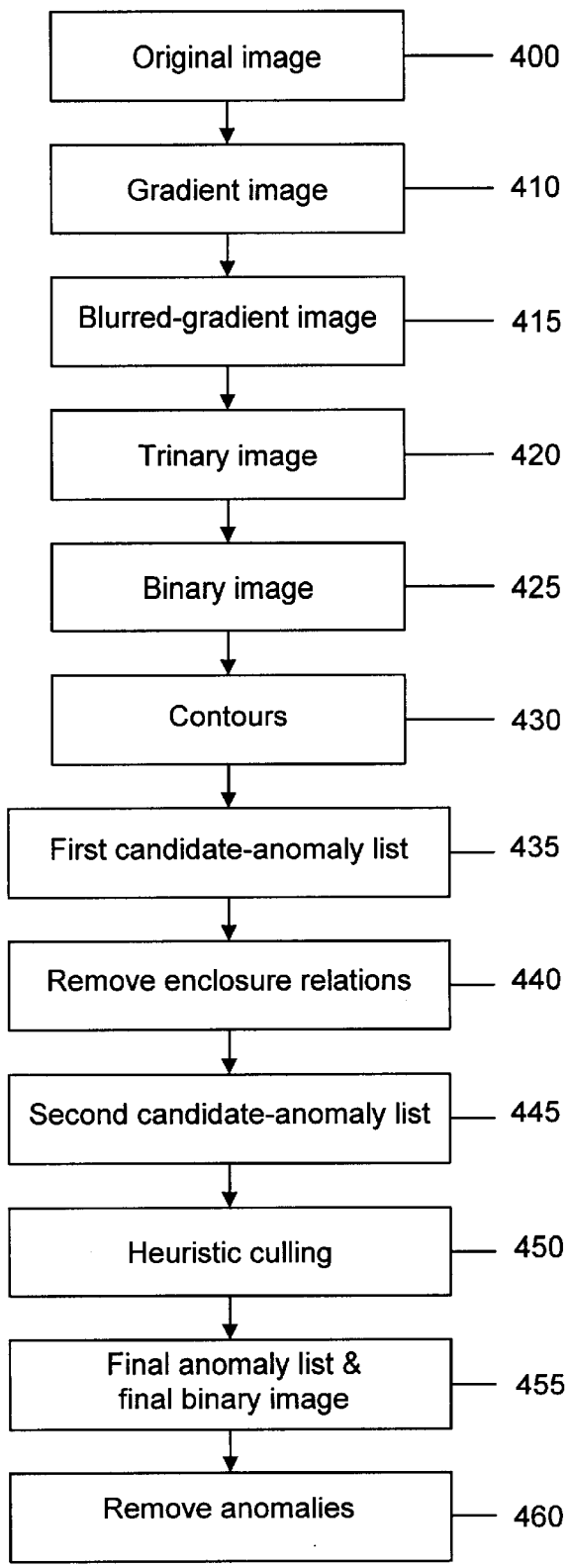
FIG. 7 is a flow chart of the sequence of operations in the specific embodiment.

FIG. 7 is a flow chart illustrating a process for detecting and tagging dust or scratches in a captured image, such as the image depicted in FIGS. 6 and 7, according to an embodiment of the present invention. In computer system 71, the dusty or scratched image of initial step 400 is manipulated using the process as described in FIG. 7 to produce at step 455 a binary image in which every pixel of the original image which is not part of a dust particle or scratch has value 0 and in which every pixel which is part of a dust pixel or scratch is tagged with value 1. This tagged binary dust image can then be input at step 460 to other software outside the scope of this invention which, either automatically or with user intervention, erases the dust or scratches.

Figure 8:
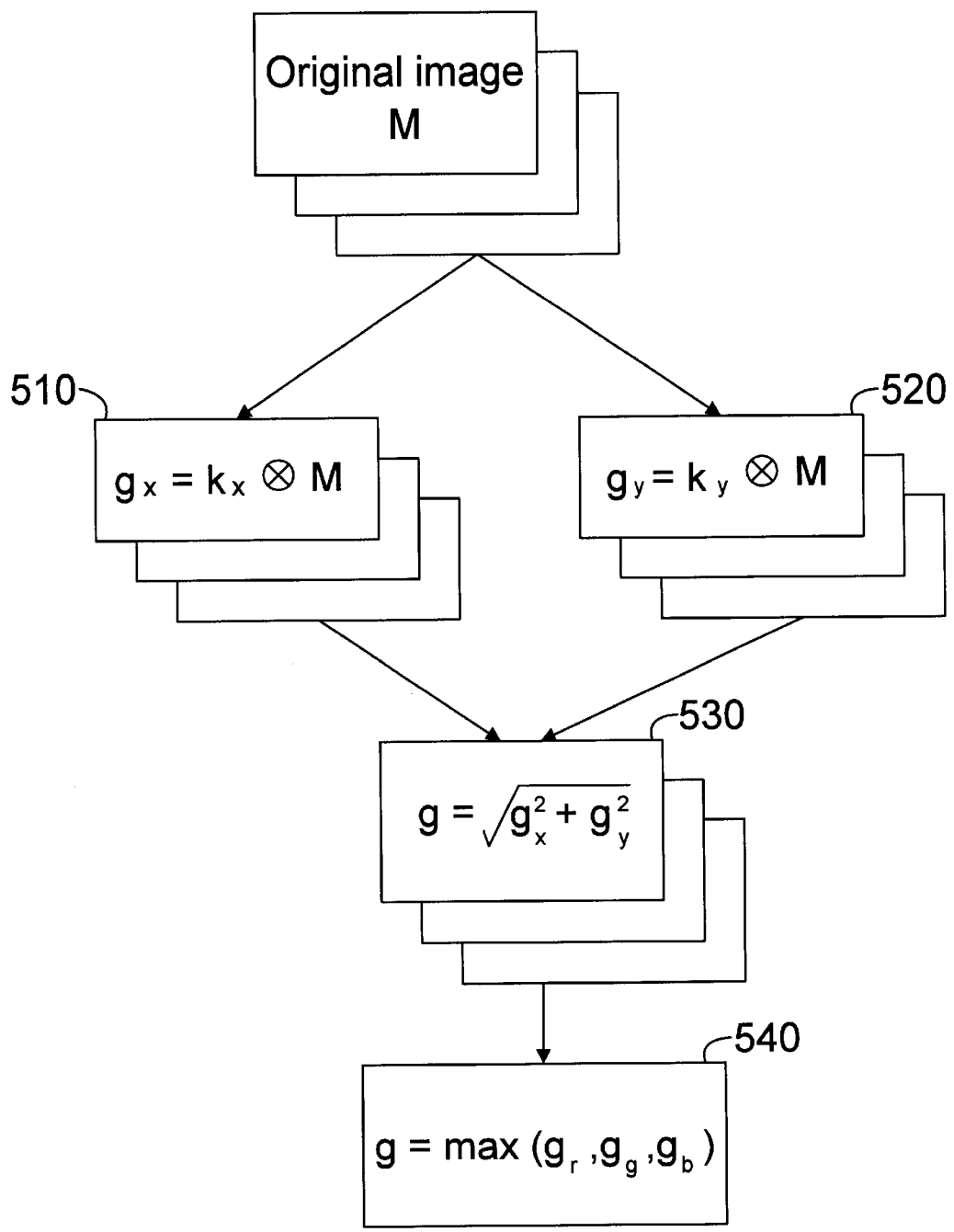
FIG. 8 illustrates the construction of the gradient image from the original image.

At step 410 of FIG. 7 a first supplemental multi-level, single-channel, vector-centered image is formed from the original image 400, using methods illustrated in FIG. 8. Typically, the original image will have one or more channels of color. Typical multi-channel images have three or more color channels. A common case is one in which the image has exactly three separate channels for red, green and blue components. This case is illustrated in FIG. 8. Each channel of the image is convolved with two kernels, the x-kernel, $k_x$ $$k_x = \begin{bmatrix} -a & a \\ -a & a \end{bmatrix}$$

and y-kernel, $k_y = k_x^T$, the transpose of $k_x$, $k_y$ $$k_y = \begin{bmatrix} -a & -a \\ a & a \end{bmatrix},$$

to produce images $g_x$ and $g_y$. The parameter a in the kernels is a positive number. It is convenient, but not essential, to choose a value for a such that the final gradient image g has the same range (the same maximum and minimum values) as do the individual color channels of the original image. The requisite value for a is 1/sqrt(8).

Each color-channel plane is convolved separately. Because the two kernels have an even number (2) of rows and columns, they produce convolved values centered on four-pixel vertices of the original image, as at the points 101, 102, 103 and 104 of FIG. 2. I.e., the convolved images are all vertex-centered with respect to the original pixel-centered image. At step 510 in FIG. 8 the x-kernel is convolved with each of the color-channel planes, thus generating a new plane $g_x$ from each former plane. At step 520 the y-kernel is convolved with each of the color-channel planes, thus generating a new plane $g_y$ from each of the color-channel planes. Next, at step 530, the $g_x$ and $g_y$ images are combined with $$g = \sqrt{g_x^2 + g_y^2}$$

per color channel to produce a set of three edge-emphasized image color channels, $g_r$, $g_g$, and $g_b$. Finally, at step 540, the three-channel image of step 530 is reduced to a single-channel image g by taking g to be, for each pixel, the maximum of the three channel values for the same pixel, $g = \max(g_r, g_g, g_b)$.

The goal of step 410, achieved by the embodiment described above, was to generate a single-channel gradient image g from the three channels of the original image. The strategy described above consisted of computing gradient values $g_r$, $g_g$, and $g_b$ for each of the channels and then finally combining the three separate gradient channels into the single gradient image g by defining g to be the maximum ($g_r$, $g_g$, $g_b$). Variants of this strategy will achieve the same goal. In one variant embodiment g is obtained by means of an averaging function defined on the triplet ($g_r$, $g_g$, $g_b$). In another variant embodiment the original multi-channel image is first converted to a single-channel monochrome image, and the x-convolved and y-convolved images $g_x$ and $g_y$ are then computed from the monochrome image.

The next step 415 in the flow chart of FIG. 7 is the formation of the multi-valued, single-channel, vertex-centered blurred-gradient image bg from the gradient image g. The blurred-gradient image is formed by convolving the gradient image g with a square averaging kernel, chosen to be significantly larger than the gradient kernels of step 410, and also chosen to have an odd number of rows and columns, so as to maintain the blurred-gradient image on the same grid as the gradient image. In one specific embodiment a size of 41 rows by 41 columns is used for the latter kernel.

In the process of forming both the blurred-gradient image bg steps are taken to ensure that the results of a convolution are defined even when the pixel being convolved is so close to the image edge that the kernel overflows the image boundary so that the convolved value is not simply defined. In the preferred embodiment the step taken is to adjust the averaging kernel for pixels near the image edge so that the averaging kernel never samples any out-of-image pixels. In some variant embodiments the step taken to achieve the same result is to extend the pre-convolution image outward in both the x and y directions, filling the so-generated borders with averages of nearby pixels in the original image. The problem of adjusting the kernel or the image so as to avoid out-of-image sampling does not happen for the gradient image g itself in cases in the preferred embodiment. The g-generating kernels of the preferred embodiment are of size two-by-two and the gradient is defined only at interior vertices of the original-image grid, so wherever the gradient is defined its generating kernels are in bounds and vice-versa.

The next step 420 in the flow chart of FIG. 7 is the formation of the three-valued (trinary-valued), single-channel, vertex-centered image t from the gradient image g and the blurred-gradient image bg. This process makes use of a greater threshold function h' and a lesser threshold function h" as illustrated by FIG. 9.

Figure 9:
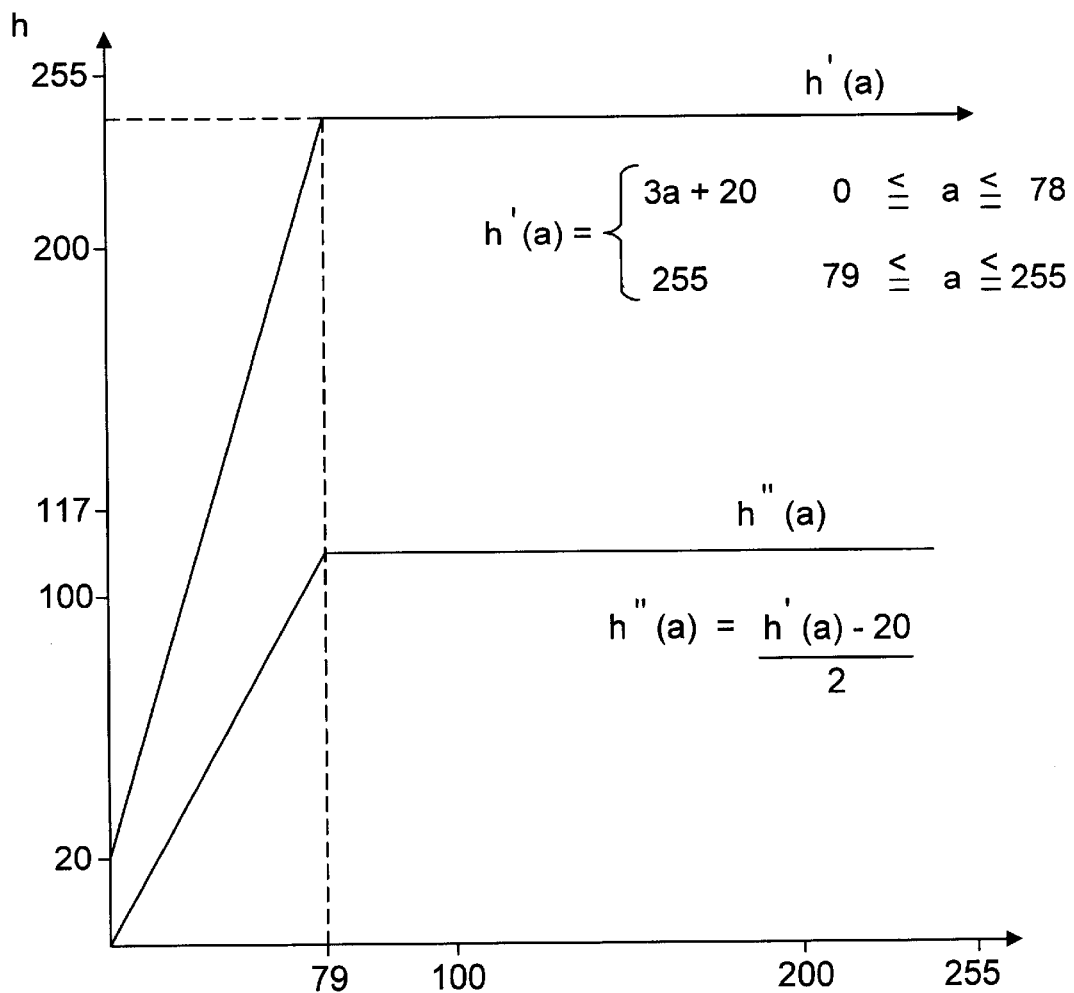
FIG. 9 illustrates the construction of upper and lower threshold values from values in the blurred-gradient image.

FIG. 9 shows two non-decreasing functions, h" and h' of the blurred-gradient pixel values a. Explicit functions are shown in FIG. 9. They are specific instances of the general requirement that the two functions be non-decreasing and that the value h'(a) of the former function be everywhere greater than the value h"(a) of the latter function.

The trinary vertex-centered image is composed by comparing a gradient value g from the gradient-image and the two thresholds, h'(a) and h"(a) computed from the blurred gradient value a at the same grid location as the gradient value g. The rule is that the value, t, in the trinary map is:

t=0 if g<h"(a);

t=1 if h"(a)<=g<h'(a);

t=2 if h'(a)<=g.

In other words, the trinary map value t is minimal (t=0) if the gradient value g is small relative to the corresponding value a in the blurred-gradient image; it is middling (t=1) if the gradient value g is somewhat large relative to the blurred-gradient value a, and it is maximal (t=2) if the gradient value is large relative to the blurred-gradient value a.

The next step 425 in the flow chart of FIG. 7 is the formation of the two-valued (binary-valued), single-channel, vertex-centered image b from the trinary image t.

This process is illustrated by FIGS. 10a, 10b and 10c.

FIG. 10a shows a trinary image. Value-0 pixels are shown as blanks; value-1 pixels are shown by light hatching; value-2 pixels are shown by heavy cross-hatching. In FIG. 10a there are three "blobs", regions of contiguous non-zero-valued pixels. Blob 600 contains both value-2 and value-1 pixels. Blob 610 contains only value-2 pixels. Blob 620 contains only value-1 pixels.

The goal of the binary map generation process is to retain only those blobs (600 and 610) which contain at least one value-2 pixel, and to discard those blobs that contain only value-1 pixels. The rationale for the procedure is that it has been found empirically that anomalous regions containing at least one extreme (value-2) pixel tend to be dust or scratches (e.g., blobs 600 and 610 of FIG. 10), whereas anomalous regions lacking any such extreme pixel (e.g., blob 620 of FIG. 10(*a*)) tend not to be dust particles or scratches.

The algorithm proceeds as follows.

It is well known in the art of digital image processing by computer to fill or flood an area of pixels. For a discussion of filling algorithms see, for example, James D. Foley et al., *Computer Graphics Principles and Practice,* Addison-Wesley Publishing Company, Second Edition in C, 1995, pp. 979–986, or Andrew Glasner, editor, *Graphic Gems,* Academic Press, Inc., 1990, pp. 275–284. The goal of a fill algorithm can be stated as: find all candidate pixels and reset their values to a target value, where the candidate pixels are any pixels which have attribute X and which indirectly connected to a pixel with attribute Y, where by "indirectly connected" it is meant that there exists a path from the given pixel to a pixel with attribute-Y which path passes over only attribute-X pixels.

Figure 10:
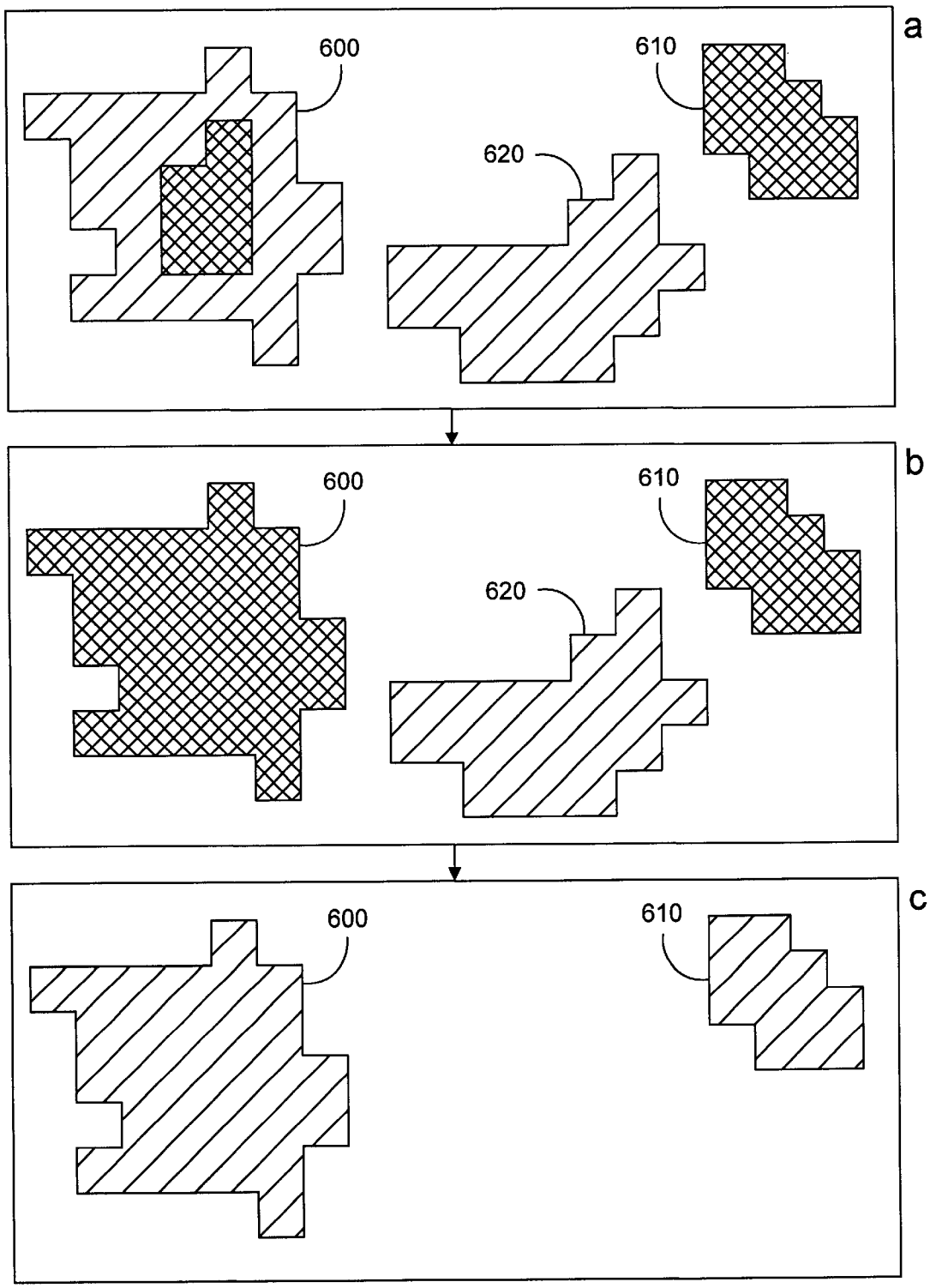
FIG. 10 illustrates the construction of the binary vertex-centered image from the trinary vertex-centered image.

FIG. 10(*b*) shows FIG. 10(*a*) after all blobs containing at least one value-2 pixel have been filled with value-2 pixels. This corresponds to a particular case of the preceding definition of a fill algorithm with:

attribute X=pixel value equals 1 or 2; and attribute Y=pixel value equals 2.

The result of the fill operation in FIG. 10(*b*) has been to cause all blobs to be uniformly filled with identical values; either value 2 or value 1. No blob now has both value-1 and value-2 pixels.

The next step from FIG. 10(*b*) to FIG. 10(*c*) is a two part process. First, all value-1 pixels are set to zero. This causes blob 620 to be eliminated. Next all value-2 pixels are set to value 1. This causes the resulting binary image 10(*c*) to have value 1 for every pixel in a blob, and value 0 for all pixels outside of blobs.

The next step 430 in the flow chart of FIG. 7 is the extraction of a set of closed contours from the binary image of FIG. 10c. The contour extraction process is illustrated by FIGS. 11a through 11e and by FIGS. 2 and 3.

Figure 11A:
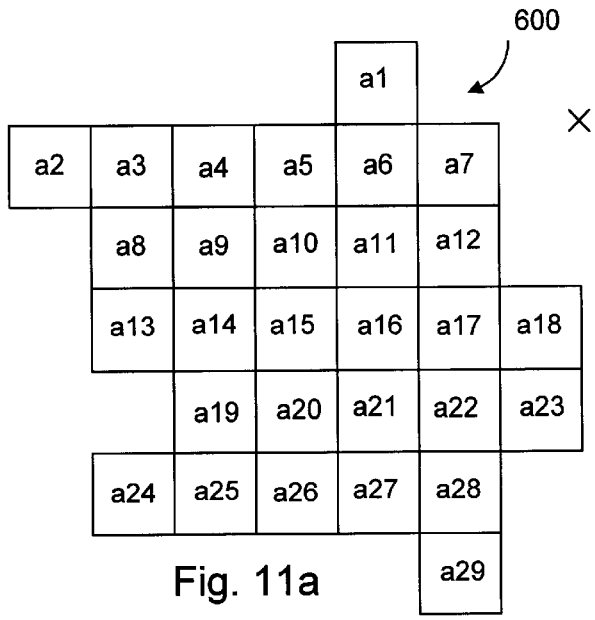
FIG. 11a is a first diagram of a contour extraction process.

FIG. 11a shows the same blob 600 that was illustrated in FIGS. 10a–c. Blob 600 is expanded in FIG. 11a, and its 29 constituent pixels are individually numbered.

Blob 600 is a constituent of the binary image b and hence is oriented to the same vertex-centered grid as the binary image. The vertex-centered grid is centered on four-pixel intersection points of the grid of the original image.

Figure 11B:
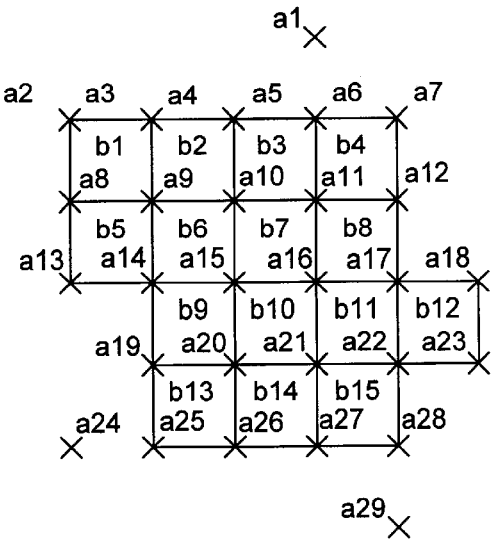
FIG. 11b is a second diagram of a contour extraction process.

The relation between the blob 600 and its binary grid on the one hand and the original image and its pixel grid on the other hand is shown in FIG. 11b. In FIG. 11b the 29 pixels of blob 600 are explicitly shown to be centered on vertices of the original grid. FIG. 11b shows 15 pixels of the original image, numbered b1 through b15, each of which is fully enclosed by four vertex-centered pixels from blob 600.

Figure 11C:
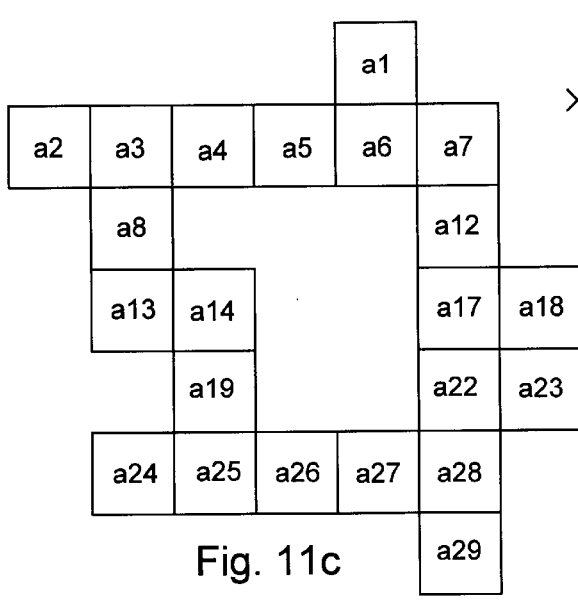
FIG. 11c is a third diagram of a contour extraction process.
Figure 11D:
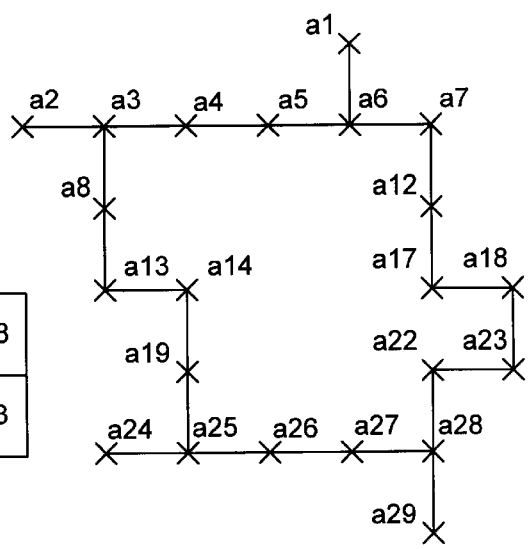
FIG. 11d is a fourth diagram of a contour extraction process.

The fifteen original-image pixels b1 through b15 are also surrounded by the contour of blob 600; i.e., by the set of pixels on the edge of blob 600. It is well known in the art of digital image processing to extract the contour of a figure such as blob 600. Such a technique is described, for example, in William K. Pratt, *Digital Image Processing,* John Wiley & Sons, 1978, p. 543. FIGS. 11c and 11d show the contour of blob 600, first, in FIG. 11c, with pixels of the contour shown as squares, and second, in FIG. 11d, with pixels of the grid shows as Xs. From a comparison of FIGS. 11b and 11d it is apparent that the contour of blob 600 entirely encloses the same points b1 through b15 of the original image grid as are individually enclosed, in FIG. 11b, by four pixels from blob 600. Comparing FIGS. 11b and 11d, it is also apparent that the outlier points of the contour, points a1, a2, a24 and a29, which form spurs from the contour itself, contribute nothing to the identification of enclosed points in the original image. These outlier points can be removed from the contour without affecting the set (b1 through b15) or original image pixels enclosed by the contour.

Figure 2:
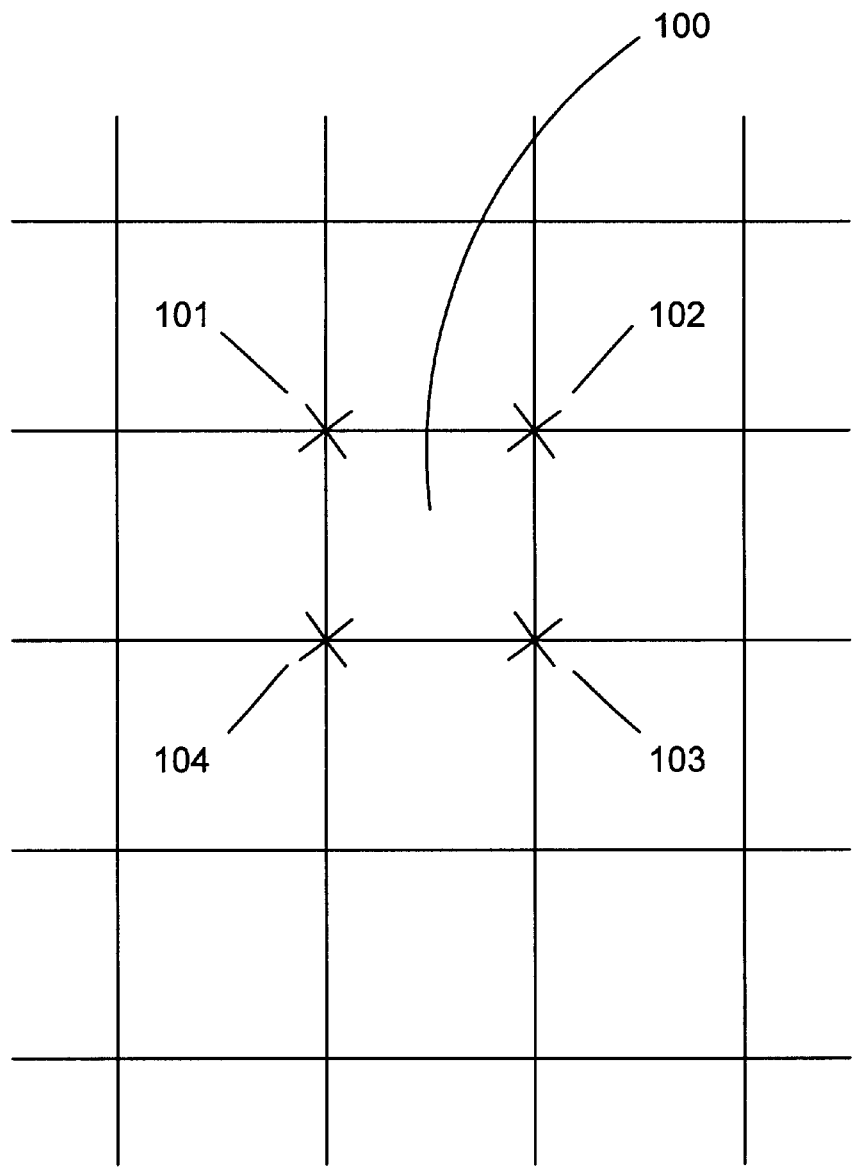
FIG. 2 illustrates the relative locations of an original pixel grid and of a vertex-centered pixel grid.
Figure 3:
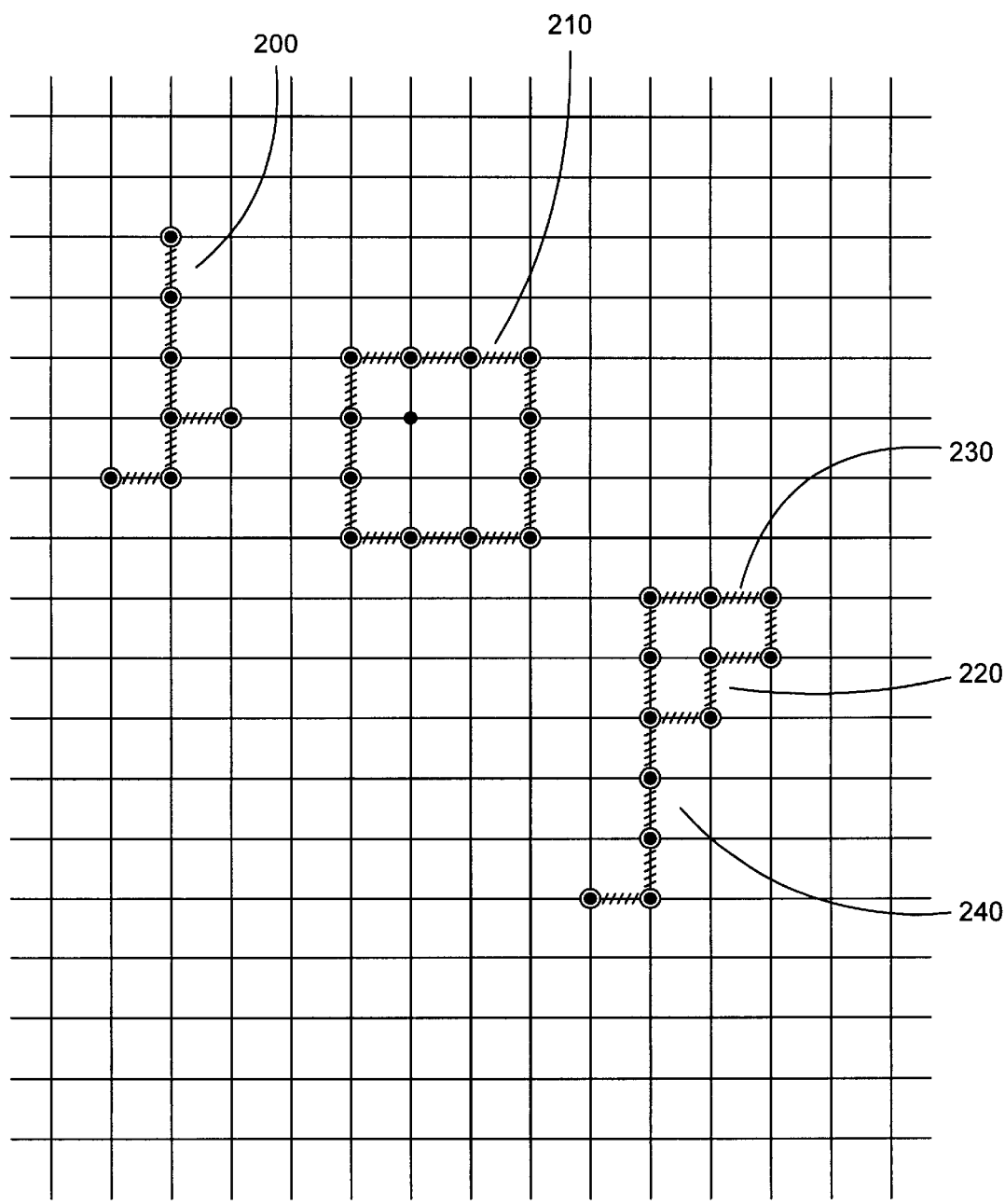
FIG. 3 shows an open, a closed and a hybrid contour on the vertex-centered grid.
Figure 4:
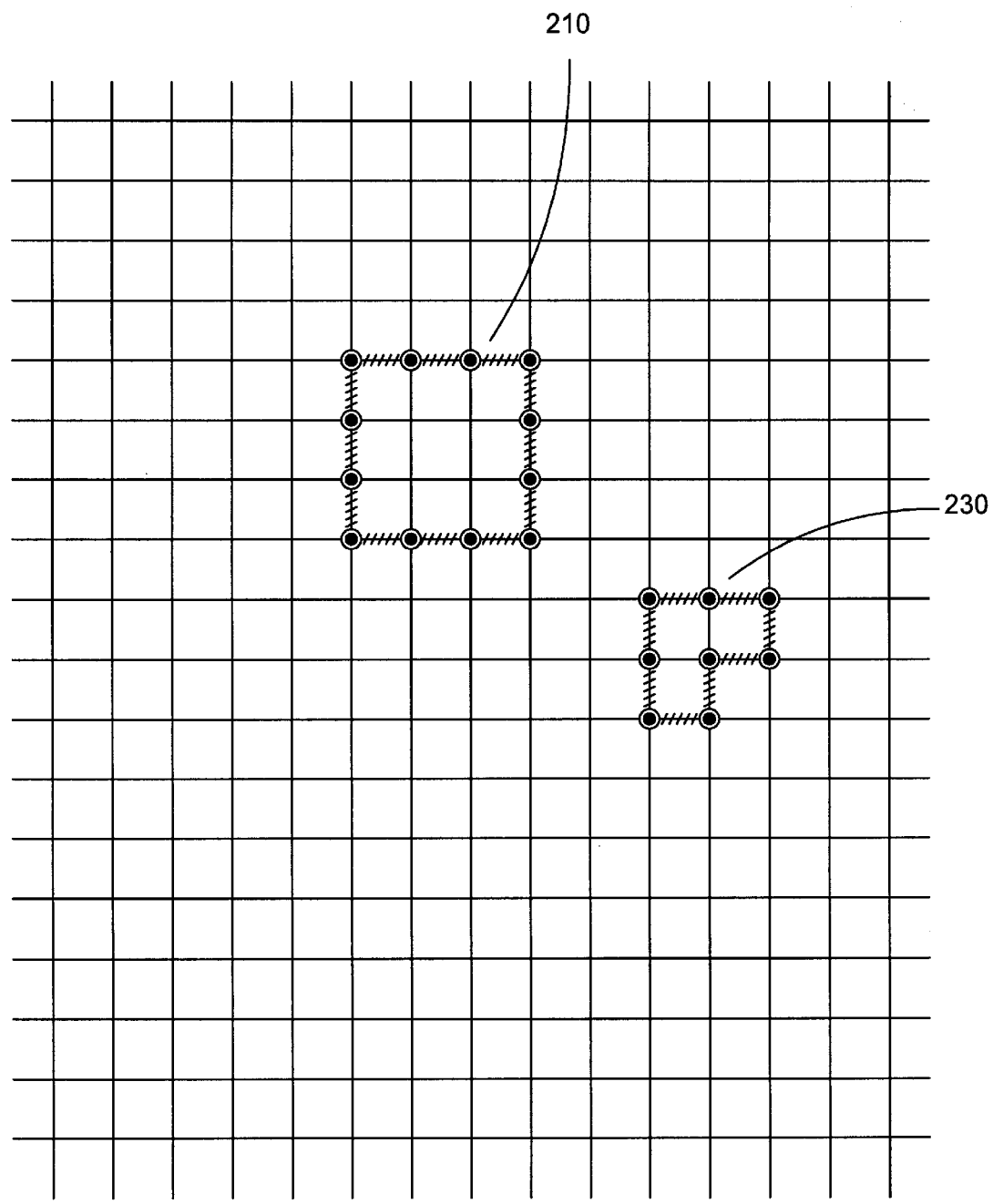
FIG. 4 shows the contours of FIG. 3 after simplification.

After forming a first contour, such as illustrated in FIG. 11d, or first set of contours, such as illustrated in FIG. 2, this invention then removes all open contours such as contour 200 of FIG. 2, and all spurs from closed contours, such as spur 240 of contour 220 in FIG. 2. The result is as shown in FIG. 3 and in FIG. 11e.

All of the closed contours described above, each of which unambiguously identifies a set of enclosed pixels of the original image, are then placed in a first candidate-anomaly list, as shown at step 435 of FIG. 7.

The individual anomalies, each a candidate to be a dust particle or a scratch, in the first candidate-anomaly list are not guaranteed to be mutually exclusive and exhaustive. I.e., it is not guaranteed that each anomalous pixel of the original image is enclosed by at most one contour of the first candidate-anomaly list.

Figure 12:
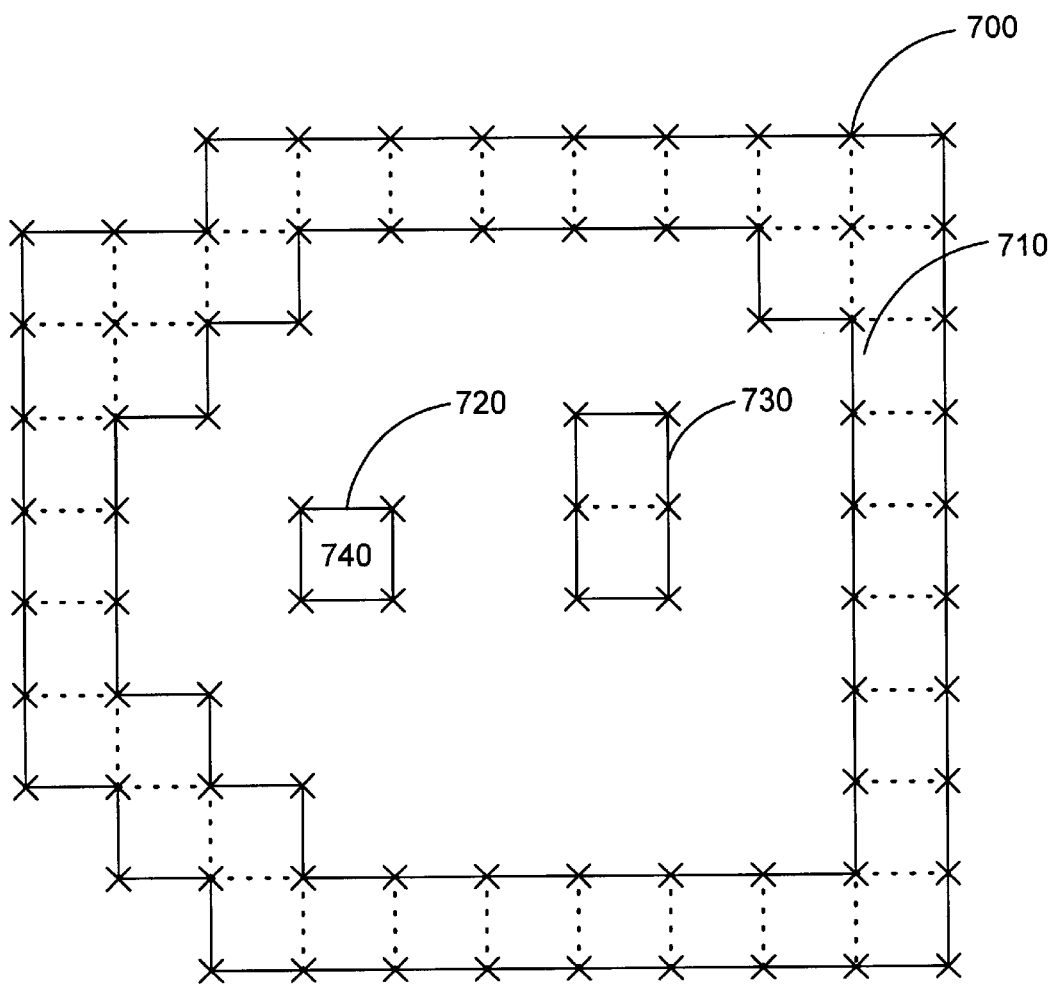
FIG. 12 illustrates a class of contours which are related by the enclosure relation.

The problem is that contours may be enclosed within one another, as illustrated in FIG. 12. FIG. 12 shows four contours, numbered 700, 710, 720 and 730, of the first candidate-anomaly list. The contours connect points, denoted by Xs, from the vertex-centered grid. Pixels in the original image are shown by squares. Original-image pixel 740 is an example of a pixel enclosed by more than one contour. It is enclosed by contours 720, 710 and 700.

The next step of this invention, shown at 440 in FIG. 7, is to cull just enough elements from the first candidate-anomaly list so that each pixel of the original image is enclosed by at most one contour. This step begins by partitioning the first candidate anomaly list into a set of enclosure-related contours. Two contours are directly enclosure-related if and only if one encloses the other. Two contours are indirectly enclosure-related if and only if there is a path of direct enclosure relationships from the first contour through a plurality of third contours to the second contour. A set of contours every pair of which is indirectly enclosure related is an enclosure-related set. When the first candidate-anomaly list is partitioned into enclosure-related sets, the vast majority of such sets will be singletons. I.e., most contours from the first candidate-anomaly list neither enclose or are enclosed by other contours, and hence belong to singleton enclosure-related sets. There may, however, be some non-singleton sets of enclosure-related contours, such as the four-element set illustrated in FIG. 12.

Each such multi-element set of enclosure-related contours is culled in the present invention by removing from it sufficient contours so that either there remains a single remaining contour or there are two or more remaining contours none of which encloses any other. This removal process is effected by first applying to each contour in the set an anomaly score, based on a combination of tests from the same set of heuristic tests (including but not limited to the shape, size, visibility, and color tests) described below in the context of the final heuristic culling operation at step 450 of FIG. 7. Contours which are more like dust particles or scratches have higher anomaly scores.

Figure 13:
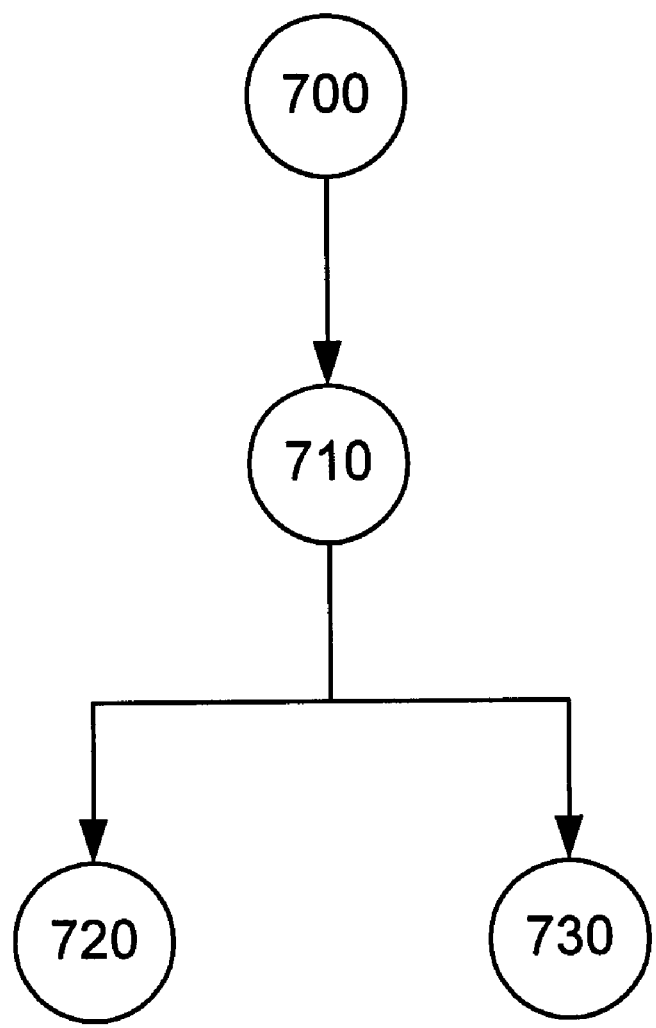
FIG. 13 illustrates an enclosure tree used to remove sets from an enclosure class until no further enclosure relations exist.

Contours in the enclosure-related set are then grouped in a dependency tree as in FIG. 13. Arrows in FIG. 13 denote enclosure. The tree is traversed in a depth first manner beginning at the root node 700. The anomaly score of each contour is compared to a threshold.

If the anomaly score is less than the threshold the contour is removed from the candidate-anomaly list. If the anomaly score exceeds the threshold, the contour is retained in the candidate-anomaly list and all of its children (all those contours it contains) are removed from the list. For example, in FIG. 13, suppose the anomaly score of the root node 700 falls short of the threshold; hence contour 700 is removed from the candidate-anomaly list. Suppose next that the anomaly score of contour 710 exceeds the threshold. Hence it is retained in the candidate-anomaly list and its children, 720 and 730, are removed from the list.

If a contour is encountered during traversal and it has no children, then it is retained in the candidate anomaly list. For example, in FIG. 13 if contour 700 failed the threshold test traversal would pass to contour 710. If contour 710 failed the threshold test traversal would pass to contour 720. Since contour 720 has no children, it would be retained in the candidate anomaly list. Traversal would then pass to contour 730, and since it too lacks children, it too would be retained in the candidate anomaly list.

When the above-described culling process is applied to all enclosure-related contour sets of the first candidate-anomaly list, a sufficient number of contours has been removed from the list so that no remaining contours are related by an enclosure relationship. The resulting contour list is the second candidate-anomaly list, shown at step 445 of FIG. 7. It is now the case that every pixel of the original image is enclosed by at most one contour from the second candidate-anomaly list.

The final step 450 of the dust-or-scratch detection and tagging process is to apply a set of heuristic tests to the second candidate-anomaly list so as to remove from the list contours which probably do not correspond to dust or scratches but which represent instead real features of the digital image.

The set of tests includes but need not be limited to a set of visibility tests, of shape tests, of size tests, and of color tests, such as are outlined below. Each test generates a score on a scale on which high values are characteristic of dust or scratches and low values are characteristic of real features in an image. Some of these tests are outlined below.

The following is a description of some visibility tests.

Figure 14A:
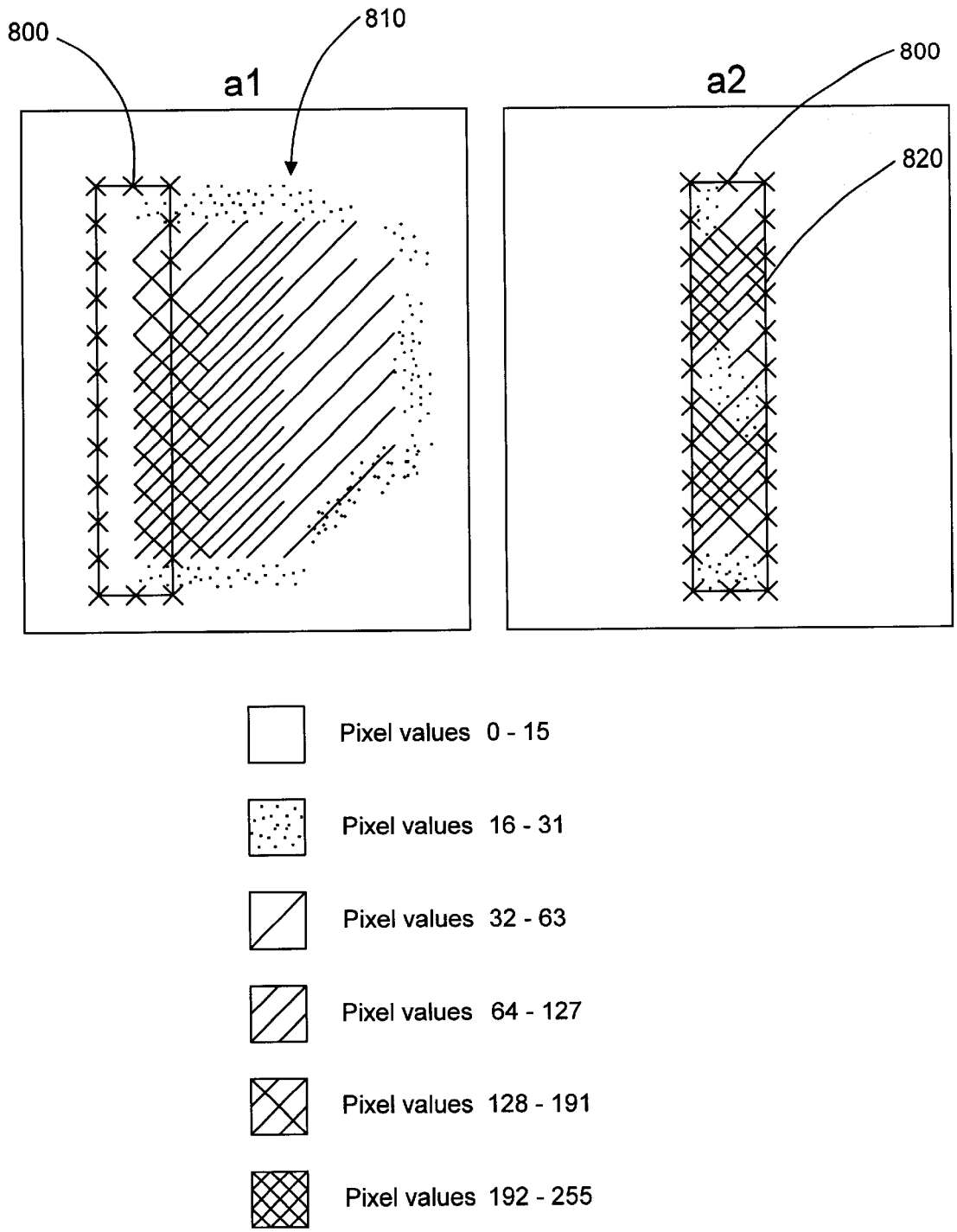
FIG. 14a illustrates two different features over pixel areas of an original image with the same contour.

This invention is based fundamentally on the gradient of the original image, as was described above. Consider the various original-image features that might lead to a gradient with a high value. Any region of the original image over which pixel values vary rapidly leads to a high gradient value. As FIG. 14a indicates, such regions include both open "cliffs" as in FIG. 14(a1), and closed "islands" as in FIG. 14(a2). Two such fundamentally different types of features may be enclosed by identical contours from the second candidate-anomaly list 445. For example, FIG. 14(a1) illustrates a sand-dune like feature 810 in the original image. Feature 810 rises gradually on its right side but has a steep cliff on its left side. The cliff gives rise to an image region with high gradient values. This high-gradient portion of the image is surrounded by contour 800. In FIG. 14(a2), however, the exact same contour 800 surrounds a region 820 which is a complete "island" of original-image pixel values which vary from the surround.

Open features like the cliff surrounded by contour 800 in FIG. 14(a1) are not characteristic of dust or scratches in an image. In contrast, closed features like island 720 surrounded by contour 800 of FIG. 14(a2) are characteristic of dust or scratches.

Figure 14B:
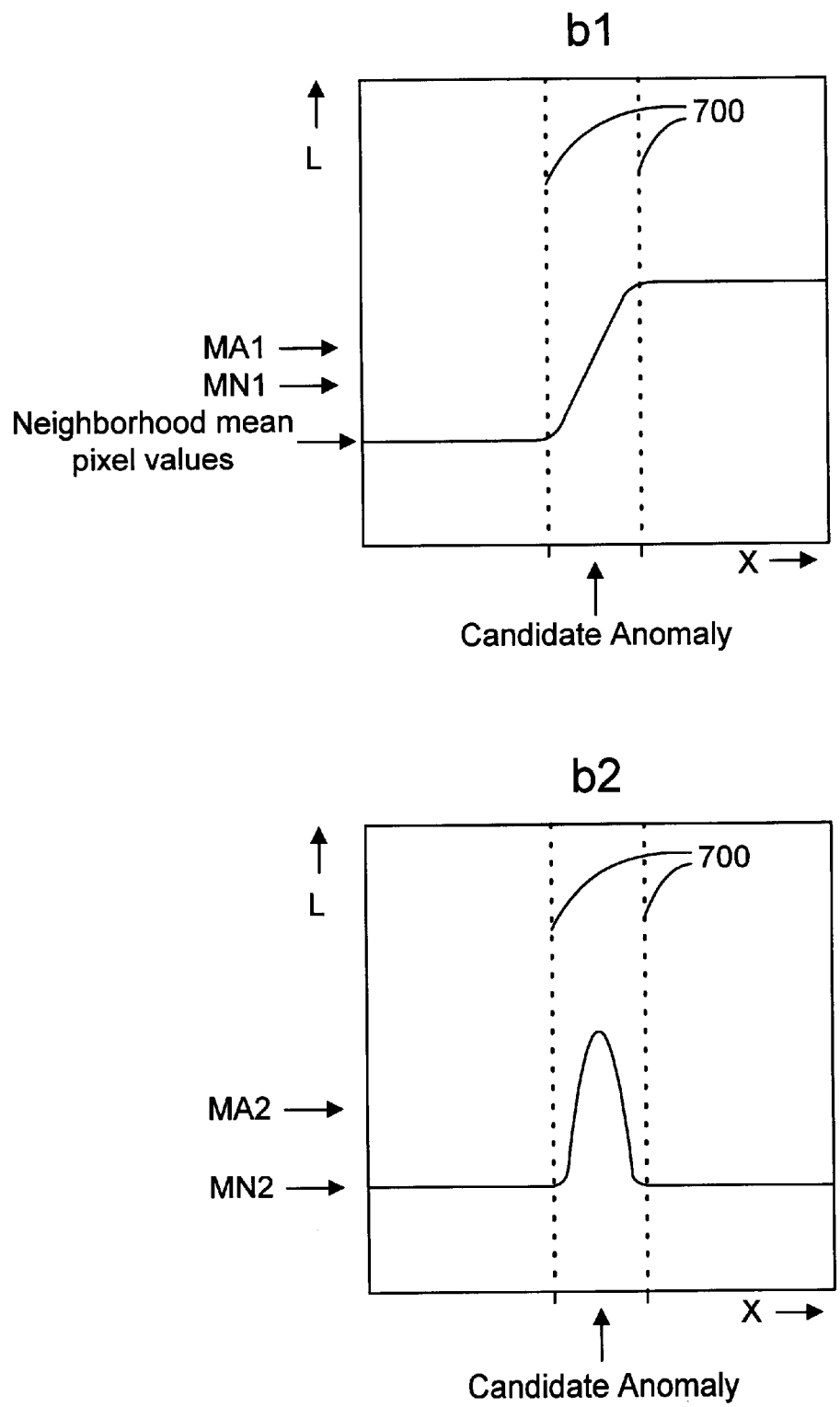
FIG. 14b illustrates properties of pixel areas used in a culling process.

The present invention includes a method for culling cliff features like the one shown in FIG. 14(a1) from the second candidate-anomaly list. The method is illustrated in FIG. 14(b).

FIGS. 14(b1) and 14(b2) illustrate on their x axes abscissas a transect across an image and on their L axes ordinates the luminances (or brightness) of pixels along the transect. FIG. 14(b1) illustrates that a characteristic of a cliff region 800 is that the mean luminance within the anomaly, MA1 in FIG. 14(b1) is very similar to the mean luminance of exterior pixels in the neighborhood of the anomaly, MN1. In contrast, FIG. 14(b2) illustrates that a characteristic of an island feature is that the mean luminance within the anomaly, MA2 in FIG. 14(b2) is considerably different from the mean luminance in the neighborhood of the anomaly, MN2.

The preceding distinction between, on the one hand, a small mean-luminance difference between a cliff region and its surround and a large mean-luminance difference between an island region and its surround is a visibility distinction in the following sense. Imagine that the two anomalies illustrated in FIG. 14(b1) and 14(b2) were repaired by replacing their pixel values with new values generated from the mean value of pixels in their surround. Then the pixels in the cliff region 700 of FIG. 14(b1), which originally had mean value MA1, would be replaced with new values with mean MN1, little different from the original values. Hence the repair would not be very visible. In contrast, if the island region 700 of FIG. 14(*b*2), with original mean pixel value MA, were replaced with new pixels values with mean MN2 generated from the surround, the repair would be very visible. Hence a measure of whether a feature in the original image is cliff-like or not is how visible the repair of the region would be. Highly visible repairs imply that the candidate region is likely to be a dust particle or a scratch and is not cliff like. Nearly invisible repairs imply the converse.

Hence a visibility measure which is a measure of the difference between the average luminance within the image and the average luminance of the immediate surround is a measure of how dust-like or scratch-like the feature is. The present invention generates a set of such visibility measures as scores for each contour in the anomaly list.

The following is a description of some size tests.

Small candidate regions are more likely to be dust particles or scratches than large regions. The present invention computes the size (number of pixels in) each candidate region, and then constructs from the size a measure, such as the reciprocal or additive inverse of size, which increases with decreasing region size. Such a measure is a dust indicator, and it too is applied as a score to each contour in the anomaly list.

The following is a description of a shape test.

Both dust particles and scratches tend to be thin. A particular definition of the thickness of a region of pixels can be based on measures of the embeddedness of the pixels in the region. Define the embeddedness of a pixel as the number of pixel boundaries (thinking of pixels as squares) that have to be crossed in order to move from the center of the pixel to the center of a pixel outside the region. Thus pixels on the edge of a region have embeddedness of 1, and pixels one-step further inside the boundary have embeddedness of 2, etc. The thickness of a pixel region can then be defined as the embeddedness of the most embedded pixel in the region. A large thickness value suggests that a region is not dust or a scratch. Conversely, the reciprocal of the thickness (the thinness of the region) is a dust indicator, and it too is applied as a score to each contour in the anomaly list.

The following is a description of some color tests.

It is well known in the art of digital image processing to convert a (red, green, blue) triplet denoting color into a new (hue, saturation, luminance) triplet whose three components denote, respectively, the hue of the color as an angle between 0 and 360 degrees, the saturation or colorfulness of the color as a number between 0 and 1 and the luminance or brightness of the color as a number between 0 and 1. For a discussion of such measures see, for example, James D. Foley et al., *Computer Graphics Principles and Practice,* Addison-Wesley Publishing Company, Second Edition in C, 1995, Ch. 13, pp. 563–604. It has already been noted above that one set if heuristic dust-like measure is based positively on the mean luminance of a candidate group of pixels as compared to the mean luminance of surrounding pixels. Another heuristic set of dust-like measures is based negatively on the mean hue and/or saturation measures of a group of pixels and the mean hue and/or saturation measures of the surrounding pixels. Such a measure can be constructed from the Euclidean distance between the mean (hue, saturation) pair of the candidate region and the mean (hue, saturation) pair of the surrounding region. An alternate measure, constructed from angular hue differences only, ignoring saturation, is the difference between the mean hue angle of the candidate region and the mean hue angle of the surrounding region. Each such distance or difference is then transformed into a proximity measure by taking its reciprocal. The governing heuristic observation here is that the more a candidate anomaly differs in hue and/or saturation from its surround, the more likely it is to be a real object in the image (for example, a flower) rather than a dust spot or scratch. Hence a measure of hue and/or saturation proximity is a dust indicator, and it too is applied as a score to each contour in the anomaly list.

The result of the computation of the set of heuristic measures is a table whose rows are the identification numbers of the contours in the second candidate-anomaly list 445 and whose columns are a the values of several heuristic measures of how dust-like or scratch-like the particles are, including, but not limited to visibility, size, shape and color measures. A decision rule is then formulated, under which some combination of low scores on these several tests is deemed to exclude a candidate dust or scratch region from retention in the anomaly list. For each contour in the list, the decision rule is then applied to its set of heuristic measures and the contour is removed from the list if it fails the measure.

Figure 11E:
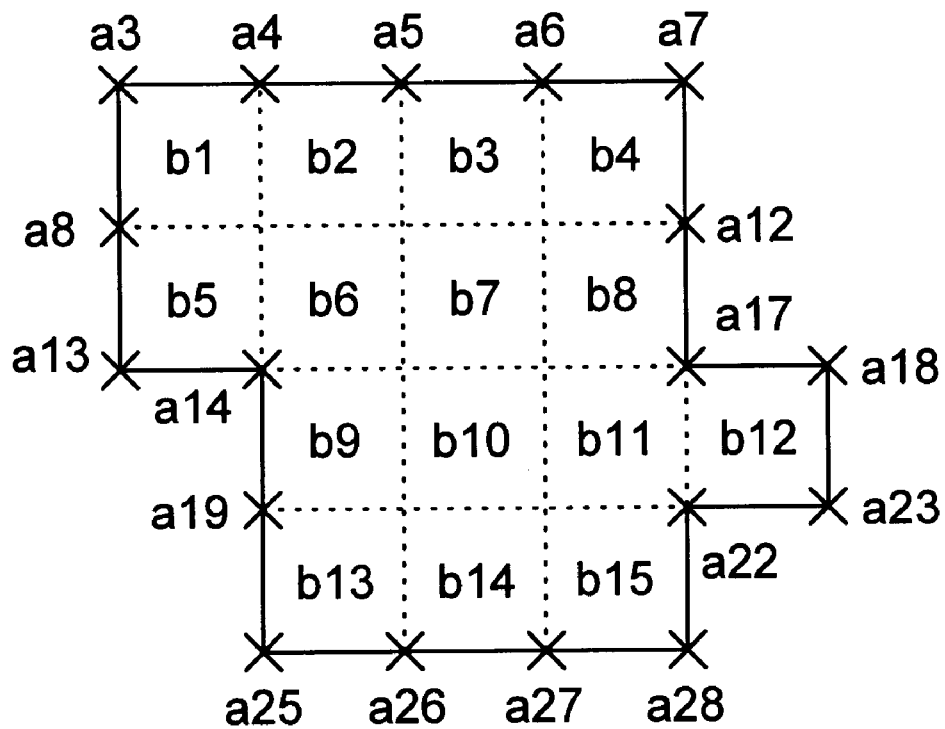
FIG. 11e is a fifth diagram of a contour extraction process.

The result of this heuristic culling process is then a new list containing a subset of the elements of the second candidate-anomaly list 445. This new list is the final anomaly list 455 of FIG. 7. Each item in the final anomaly list 455 is a closed contour of the vertex-centered grid, and so, as shown in FIG. 11*e*, each such contour uniquely determines a set of pixels of the original image which it encloses. So the final anomaly list of step 455 also determines at step 455 a final binary image on the pixel grid of the original image, in which all original-image pixels within dust or scratch regions have value 1 and all other pixels have value 0.

The next step undertaken by an actual computer software application incorporating the present invention for dust and scratch detection and tagging will be to remove the dust and scratch sub-images from the original image. This step of removing the anomalies is step 460 of FIG. 7. The anomaly-removing step can be done with varying degrees of user intervention. At the most un-automatic extreme, the set of anomalies from the final anomaly list is highlighted on the computer screen and the computer user is allowed to choose which of the anomalies to remove. At the most automatic extreme, all anomalies from the final anomaly list can be removed using an approach such as the approach of the invention in U.S. patent application Ser. No. 09/087,284, filed May 29, 1998, entitled "Image Enhancing Brush using Minimum Curvature Solution," by Minner, to be assigned to the same assignee as the present invention. In the latter invention, all anomalies from the final anomaly list are first converted to voids, with all pixels set to zero, in the original image. The voids are then filled in based on the values of pixels in the region surrounding them.

One variant embodiment of the current invention uses the above-referenced anomaly-removing technique as a tool in the heuristic culling step 450. This variant replaces steps 450 through 460 of FIG. 7 with the variant steps 465 through 480 of FIG. 15.

The heuristic culling procedure described above (step 450 of FIG. 7) included a visibility test that compared the mean luminance of a candidate anomaly with the mean luminance of the surrounding pixels. It included a color test that compared the mean hue and saturation of a candidate anomaly with the mean hue and saturation of the surrounding pixels.

One technique for making such comparisons of a region with its neighboring region is to go ahead and do a practice repair of the region, and then to compare the mean characteristics (luminance, hue or saturation) of pixels in the region before and after the practice repair. The repair algorithm referenced above is such that pixels in the region after it is repaired from pixel values in the surrounding pixel region are similar to the pixels in the surrounding region itself. Thus a comparison of pixels in a region before and after repair is similar to comparison of pixels in a region to pixels in the surround region.

Figure 15:
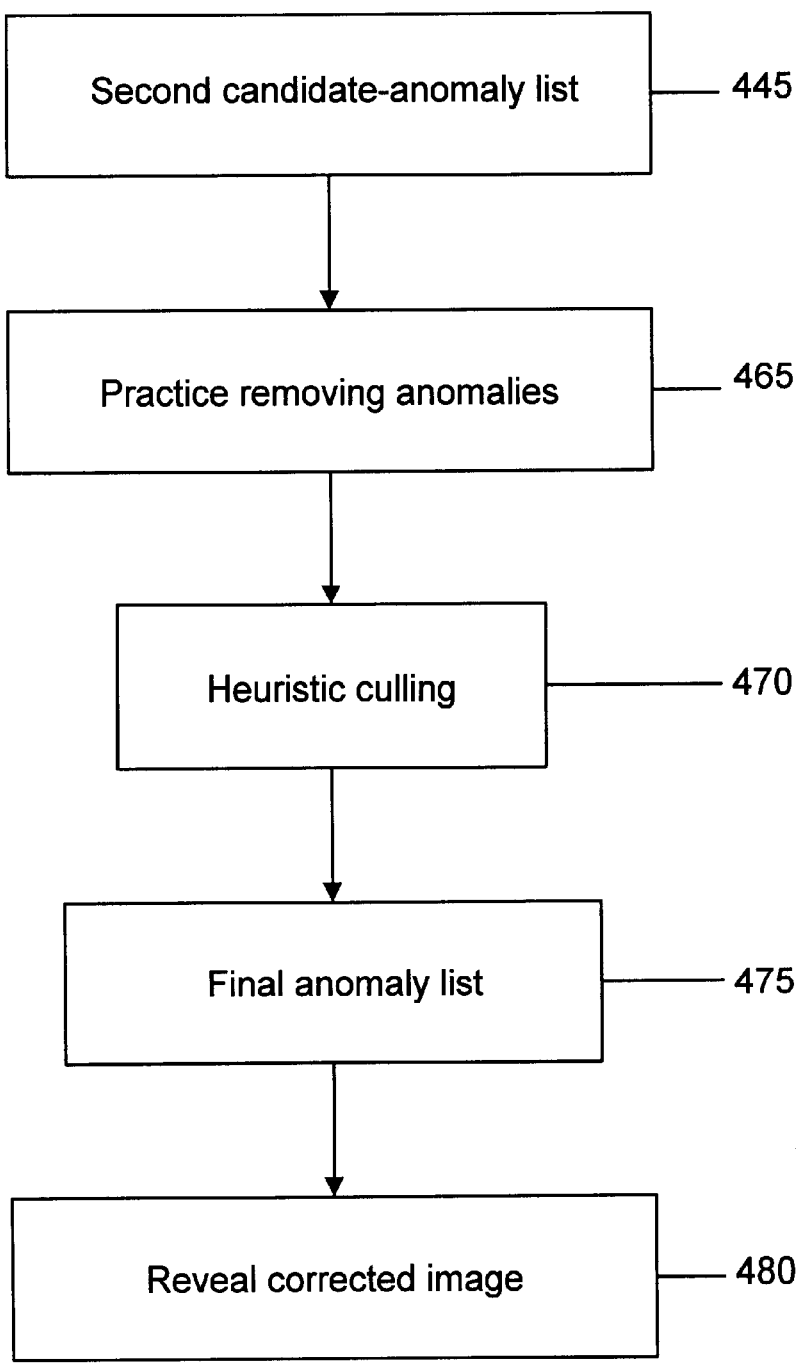
FIG. 15 illustrates the last five operations of a variant of the preferred embodiment.

In this variant embodiment, the step of practicing removing the anomalies, step 465 of FIG. 15, follows immediately after generation of the second candidate anomaly list. In step 465 all anomalies are removed using the same techniques as in the final step 460 of the preferred embodiment of FIG. 7. But the anomaly-removal step 465 is not a final step but a practice step. In particular, the original image is kept in computer memory along with the repaired-anomaly image so that the removal of any supposed anomaly from the second candidate-anomaly list 445 can later be reversed if it is decided that the candidate anomaly is not a true anomaly.

At step 470 of FIG. 15 the practice anomaly repairs serve as input into the heuristic culling process. In particular, the process of generating any of the anomaly scores may make use of statistics generated by comparing the pixels of the anomaly before and after it is repaired.

At step 475 of FIG. 15 the result of the heuristic culling process is a final anomaly list, step 475 of FIG. 15, as in the step 455 of FIG. 7 in the preferred embodiment.

There is now, however, a significant computational advantage in the variant embodiment of FIG. 15 over the embodiment of FIG. 7. Practice repairs of all candidate anomalies have already been made, and maintained in a computer bit map as a result of step 465. The original image has also been maintained. Hence the process of removing all anomalies from the original image at step 480 of FIG. 15 is just a matter of going down the second list of candidate anomalies, 445, and (a) if the anomaly has been rejected in the final anomaly list restoring its bitmap image from the original image to the practice image, and (b) if the anomaly has been retained in the final anomaly list, doing nothing to the corresponding repaired regions in the practice image. Finally, the so-modified practice image is then taken as the final corrected image. Hence this last step is a step of revealing the corrected image, step 480 of FIG. 15, since all the necessary images for the final image exist either in the original image or in the practice image generated at step 465.

In conclusion, the present invention provides a simple, efficient solution to the problem of identifying and tagging representations of dust or of scratches in a digital image. While the above is a complete description of the preferred embodiments of the invention, various alternatives, modifications and equivalents may be used.

For example, the preferred embodiment includes a number of operational steps A, B and C each of which is applied sequentially to candidate-anomalies or other items 1, 2, . . . , n. So, if n=2, the order of operation is A1, A2, B1, B2, C1, C2. In many such cases it is feasible to instead apply the operations in sequence to each of the items, in which case the order of operation in the example above is A1, B1, C1, A2, B2, C2. For example, in FIG. 15 the operational steps of (A) Practice removing anomalies is first, at point 465, applied to all n anomalies and then the step (B) Heuristic culling is applied to all n anomalies. Instead steps A and B might be applied to anomaly 1, steps A and B might then be applied to anomaly 2, and so forth.

Ordinarily, the dust-and-scratch removing invention is part of a larger computer application over which a user exercises control. The user may have some a priori notion of the likelihood that pollution of the image is caused by dust or by scratches. In this case the user may adjust a scale running continuously from one extreme value denoting that dust is likely to another extreme value denoting that scratches are likely, with an intermediate value denoting that dust and scratches are equally likely. Based on this index, the heuristic measures obtained for the heuristic culling operation 450 of FIG. 7 may be weighted so as to give more or less weight-of-evidence to measures of dust-like characteristics or scratch-like characteristics of the candidate anomalies.

Other heuristic dust-like and scratch-like measures can be used, in addition to those described above. For example, the construction of the original gradient image at step 410 of FIG. 7 included the construction of separate x-gradient and y-gradient measures $g_x$ and $g_y$ for each channel of the image. These separate x- and y-gradients where combined into $$g = \sqrt{g_x^2 + g_y^2}$$

for each channel, and then the constituent $g_x$ and $g_y$ values were discarded. It can be useful for the later heuristic culling process to retain the constituent x- and y-gradients, producing a vertex-centered, multi-valued, two-channel gradient map in which the two channels are $g_x$ and $g_y$. The latter map shows for each pixel its vector gradient ($g_x$, $g_y$). The latter pairs may then be used to develop another form of the heuristic visibility test. The aim of this test, as illustrated in FIG. 14a and 14b, is to determine whether an original-image feature surrounded by a contour is more like a cliff or more like an island. Knowledge of the gradient vectors ($g_x$, $g_y$) over the region can assist in such a determination.

In light of the various alternatives, modifications and equivalents to the present invention, the above description should not be taken as limiting the scope of the invention which is defined solely by the appended claims.

What is claimed is:

1. A method for determining the presence and location of anomalies within a digital original image, said method comprising the steps of:

forming a gradient image, in which the value of one or more pixels is a measure of the magnitude of the gradient of the original image at a corresponding location;

using the gradient image to determine anomalies in the original image;

forming from the gradient image a blurred-gradient image, in which the value of one or more selected pixels in the gradient image is replaced by a value derived from a combination of two or more values of pixels in the neighborhood of the selected pixels in the gradient image; and using the gradient image and the blurred-gradient image to determine anomalies in the original image.

2. The method of claim 1, further comprising the steps of using the gradient image and the blurred-gradient image to form a list of mutually-exclusive candidate anomalies in the original image; and culling the list of candidate anomalies.

3. The method of claim 2 wherein the anomalies include images of dust particles.

4. The method of claim 2 wherein the anomalies include images of scratch marks.

5. The method of claim 2 wherein the gradient image is a multi-level, single-channel image.

6. The method of claim 2 wherein the blurred-gradient image is a multi-level image.

7. The method of claim 2 wherein the step of forming the blurred-gradient image includes the sub step of using a weighted sum of the gradient values of pixels, from the gradient image, in the neighborhood of the selected pixels to compute pixels in the blurred-gradient image.

8. The method of claim 7 wherein the step of forming the blurred gradient-image by the sub step of using a weighted sum of the gradient values of pixels in the neighborhood of the selected pixels includes:

designing the weighted sum so that it is a measure of the mean of the values of the neighborhood pixels, guaranteed to take on a value intermediate between the maximum and minimum values of the neighborhood pixels.

9. The method of claim 2 wherein the step of culling includes the substep of applying a heuristic test.

10. The method of claim 2 wherein the images are comprised of pixel grids, wherein the pixel grid of each of said gradient image and said blurred-gradient image is oriented with respect to the pixel grid of the original image so that the position of the center of a pixel in the gradient and blurred-gradient images corresponds to the vertex formed at the corner boundary of four pixels in the original image.

11. The method as defined in claim 2 wherein the original image has multiple color channels, wherein the step of forming the gradient image includes the substeps of convolving each color channel of the original image with a kernel or set of kernels; and combining the resulting convolved images into a resultant multi-level single-channel image wherein the design of the kernels and of the method of combination of the convolved images is such that an extreme value of a pixel of the resultant combined image is an indicator that the values in the channels of the original tend to change rapidly over an area of the original image centered on the pixel of the combined resultant image.

12. The method as defined in claim 11 wherein the steps of convolving each color channel of the original image with a kernel or set of kernels, and then combining the resulting convolved images into a resultant multi-level, single-channel gradient image, comprises (a) always using in the convolution kernels with an even number, n, of rows and columns, so that the pixel grid of each convolution (the vertex grid) is such that the center of each pixel in the pixel grid is aligned with the vertex of intersection of four pixels in the original image;

(b) convolving each color channel of the original image with an x-kernel, a square kernel of an even number, n, of rows and columns, with values of the kernel designed so that an extreme value of the convolution indicates a point at which the underlying image values are changing rapidly in the x direction;

(c) convolving each color channel of the original image with a y-kernel, a square kernel of the same even number, n, of rows and columns as was used for the x-kernel, with values of the kernel designed so that an extreme value of the convolution indicates a point at which the underlying image values are changing rapidly in the y direction;

(d) for each pixel of each color channel on the vertex grid, taking the square root of the sum of the squares of the x-convolved value and of the y-convolved value, yielding a unique gradient measure for each pixel of each color channel on the vertex grid;

(e) for each pixel of the vertex grid, taking the maximum of each aforementioned gradient measure for the corresponding pixel in each channel of the vertex grid as a measure of the gradient of the image at that pixel.

13. The method as defined in claim 2 wherein the step of forming from the gradient image a second supplemental multi-level image, the blurred-gradient image, in which the value of each pixel of the gradient image is replaced with a weighted sum of the gradient values of pixels in the neighborhood of that pixel in the gradient image comprises convolving the gradient image with an averaging kernel of size (length and width) substantially larger than the size of the kernel or kernels used to generate the gradient image itself.

14. The method as defined in claim 2 wherein said step of forming from the gradient image and the blurred-gradient image a list of mutually-exclusive candidate dust-or-scratch regions of the original image, comprises the steps of:

(a) forming from the gradient image and the blurred-gradient image a supplemental binary-valued, single-channel image on the same pixel grid as the gradient and blurred-gradient images; and (b) forming from the supplemental binary-valued, single-channel, image a list of mutually-exclusive candidate dust-or-scratch regions in the original image.

15. The method as defined in claim 14 wherein said step of forming from the gradient image and the blurred-gradient image a supplemental binary-valued single-channel image on the same pixel grid as the gradient and blurred-gradient images (a) forming from the gradient image and the blurred-gradient images supplemental trinary-valued, single-channel image on the same pixel grid as the gradient and blurred-gradient images; and (b) converting said supplemental trinary-valued, single-channel image to a binary-valued image.

16. The method as defined in claim 15 wherein said step of forming from the gradient image and the blurred-gradient image a supplemental trinary-valued image comprises comparing the value of the pixel in the gradient image (the first value) to the value of the corresponding pixel in the blurred-gradient image (the second value), and then assigning to the corresponding pixel in the supplemental trinary image a value of 0, 1 or 2, according to whether the first value is small, somewhat large, or very large compared to the second value.

17. The method as defined in claim 16 wherein said step of assigning to a pixel, t, in the supplemental trinary image a value of 0, 1 or 2, according to whether the value of a pixel in the gradient image (the gradient value, g) is small, somewhat large, or very large compared to the value of a corresponding pixel in the blurred-gradient image (the blurred value, v) comprises (a) defining two non-decreasing functions, f' and f", over the set of values in the blurred-gradient image, with the additional property that for any blurred value v then f'(v)>f"(v), and (b) transforming the blurred value v into a primal threshold h'=f'(v) and into a secondary threshold h"=f"(v), and concluding that (c) g is small so that t=0 if g<h", and (d) that g is large so that t=1 if h"<=g<h', and (e) that g is very large so that t=2 if h'<=g.

18. The method as defined in claim 15 wherein said step of forming from the supplemental trinary-valued image a binary-valued image comprises (a) for any portion of the trinary-valued image comprising a contiguous region of pixels with value 1 or 2, and containing at least one pixel of value 2 replacing all pixels of value 1 with value 2, and then (b) over the entire image, replacing all pixels of value 1 with value 0, and then (c) over the entire image, replacing all pixels of value 2 with value 1.

19. The method as defined in claim 14 wherein said step of forming from the supplemental binary-valued, single-channel image a list of mutually-exclusive candidate dust-or-scratch regions comprises the steps of (a) forming from the supplemental, binary-valued image a first candidate-anomaly list of potentially non-mutually-exclusive candidate dust-or-scratch regions, and then (b) rearranging the list of potentially non-mutually-exclusive candidate dust-or-scratch regions into a second candidate-anomaly list of mutually-exclusive candidate dust-or-scratch regions.

20. The method as described in claim 19 wherein the step of forming from the supplemental, binary-valued image a first candidate-anomaly list of potentially non-mutually-exclusive candidate dust-or-scratch regions comprises forming from the supplemental, binary-value image the list of all closed contours in that image, each such contour uniquely specifying a set of enclosed pixels of the original image.

21. The method as defined in claim 19 wherein said step of rearranging the list of potentially non-mutually-exclusive candidate dust-or-scratch regions into a second candidate-anomaly list of mutually-exclusive candidate dust-or-scratch regions comprises (a) partitioning the first list of candidate-anomalies into sets within which every pair of contours is related by an indirect equivalence relation;

(b) constructing the dependence tree of each non-singleton equivalence-relation set, in which dependent nodes are called children, and the nodes on which they depend are called parents;

(c) traversing each such tree, examining each node, and either including it or excluding it in such a manner that either (c1) only one node remains from the tree, or (c2) among the two or more nodes remaining from the tree, no two nodes are related by an indirect equivalence relation.

22. The method as defined in claim 21 wherein said step of traversing each enclosure-relation tree, examining each node, and either including it or excluding it traversing each such tree, examining each node, and either including it or excluding it comprises traversing each such tree in a depth first manner and for each element (a) excluding it from the second candidate-anomaly list if its score on a heuristic dust-or-scratch-like measure is below a threshold value, and (b) including it in the second candidate-anomaly list if its score on the heuristic dust-or-scratch-like measure is above a threshold value, and in that case also excluding all children of the contour from the second candidate-anomaly list, and (c) including it in the second candidate-anomaly list if it has no children.

23. The method as defined in claim 2 wherein the step of culling the list of candidate dust-or-scratch regions by applying to it a test based on a plurality of heuristic measures comprises (a) generating a plurality of shape, size, visibility and color measures applied to each candidate dust-or-scratch region and its surrounding region, and obtaining the value of each candidate dust-or-scratch region on each such measure;

(b) generating a decision rule, under which the set of shape, size, visibility and color measures for each candidate dust-or-scratch region is transformed into a decision to cull or not to cull the region from the list;

(c) culling the list of candidate dust-or-scratch regions using said measures and said decision rule.

24. The method as defined in claim 2 wherein the step of culling the list of candidate dust-or-scratch regions by applying to it a test based on a plurality of heuristic measures comprises (a) performing a practice repair of the dust-or-scratch region in which the pixels of the dust-or-scratch region are replaced by pixels interpolated from the surrounding region;

(b) generating a plurality of shape, size, visibility and color measures applied to each candidate dust-or-scratch region before and after its repair, and obtaining the value of each candidate dust-or-scratch region on each such measure;

(c) generating a decision rule, under which the set of shape, size, visibility and color measures for each candidate dust-or-scratch region is transformed into a decision to cull or not to cull the region from the list;

(d) culling the list of candidate dust-or-scratch regions using said measures and said decision rule.

* * * * *